United States Patent
You et al.

(10) Patent No.: US 10,122,501 B2
(45) Date of Patent: Nov. 6, 2018

(54) METHOD FOR RECEIVING ACK/NACK SIGNAL AND MTC DEVICE

(71) Applicant: LG ELECTRONICS INC., Seoul (KR)

(72) Inventors: Hyangsun You, Seoul (KR); Yunjung Yi, Seoul (KR); Suckchel Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/524,100

(22) PCT Filed: Nov. 3, 2015

(86) PCT No.: PCT/KR2015/011678
§ 371 (c)(1),
(2) Date: May 3, 2017

(87) PCT Pub. No.: WO2016/072688
PCT Pub. Date: May 12, 2016

(65) Prior Publication Data
US 2017/0338911 A1 Nov. 23, 2017

Related U.S. Application Data

(60) Provisional application No. 62/075,269, filed on Nov. 5, 2014, provisional application No. 62/081,498, filed
(Continued)

(51) Int. Cl.
*H04L 1/18* (2006.01)
*H04L 5/00* (2006.01)
(Continued)

(52) U.S. Cl.
CPC .............. *H04L 1/1812* (2013.01); *H04L 1/18* (2013.01); *H04L 1/1861* (2013.01); *H04L 5/00* (2013.01);
(Continued)

(58) Field of Classification Search
CPC combination set(s) only.
See application file for complete search history.

(56) References Cited

U.S. PATENT DOCUMENTS 9,408,158 B2 * 8/2016 Yin ....................... H04W 52/22
2013/0182626 A1 7/2013 Kuo
(Continued)

FOREIGN PATENT DOCUMENTS

| WO | 2013174263 | 11/2013 |
|---|---|---|
| WO | 2013176478 | 11/2013 |
| WO | 2014021632 | 2/2014 |

OTHER PUBLICATIONS

PCT International Application No. PCT/KR2015/011678, Written Opinion of the International Searching Authority dated Mar. 31, 2016, 6 pages.

*Primary Examiner* — Warner Wong
(74) *Attorney, Agent, or Firm* — Lee, Hong, Degerman, Kang & Waimey

(57) ABSTRACT

The present disclosure provides a method for a machine type communication (MTC) device to receive a hybrid automatic repeat request (HARQ) acknowledgement (ACK)/non-acknowledgement (NACK) signal. The method can include the steps of: the MTC device transmitting a physical uplink control channel (PUCCH) including uplink data; the MTC device determining a radio network temporary identifier (RNTI) for itself from among a plurality of new RNTIs; monitoring the reception of a downlink control channel in a search space; and receiving a HARQ ACK/NACK signal for
(Continued)

the transmission of the uplink data by decoding a downlink control channel scrambled with the determined RNTI.

12 Claims, 16 Drawing Sheets

Related U.S. Application Data on Nov. 18, 2014, provisional application No. 62/204,468, filed on Aug. 13, 2015.

(51) Int. Cl.
| | |
|---|---|
| *H04W 72/04* | (2009.01) |
| *H04W 72/12* | (2009.01) |
| *H04W 4/70* | (2018.01) |
| *H04L 12/18* | (2006.01) |
| *H04L 1/16* | (2006.01) |

(52) U.S. Cl.
CPC ............ *H04L 5/0055* (2013.01); *H04W 4/70* (2018.02); *H04W 72/0413* (2013.01); *H04W 72/1289* (2013.01); *H04L 1/1614* (2013.01); *H04L 1/1671* (2013.01); *H04L 12/1868* (2013.01)

(56) References Cited

U.S. PATENT DOCUMENTS

| | | | |
|---|---|---|---|
| 2013/0194980 A1* | 8/2013 | Yin | ........................ H04L 1/1607 370/280 |
| 2013/0195041 A1 | 8/2013 | Papasakellariou et al. | |
| 2014/0079032 A1* | 3/2014 | Bergstrom | ........ H04W 56/0005 370/336 |
| 2015/0207607 A1* | 7/2015 | Tang | ..................... H04L 1/1861 370/330 |
| 2015/0296490 A1* | 10/2015 | Yi | ......................... H04L 1/1812 370/329 |
| 2016/0112174 A1* | 4/2016 | Seo | ..................... H04W 72/042 370/280 |
| 2017/0105198 A1* | 4/2017 | Fu | ....................... H04W 72/042 |
| 2018/0139011 A1* | 5/2018 | Chae | ..................... H04L 1/1812 |

* cited by examiner

FIG. 6
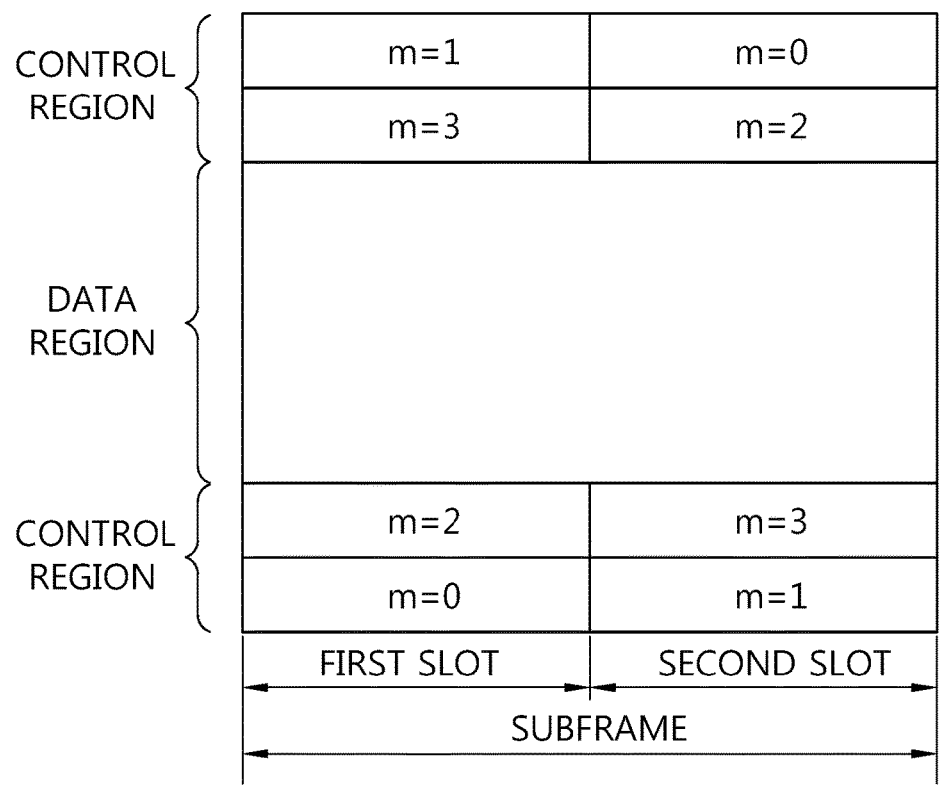
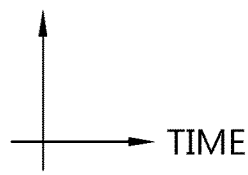

METHOD FOR RECEIVING ACK/NACK SIGNAL AND MTC DEVICE

CROSS-REFERENCE TO RELATED APPLICATIONS

This application is the National Stage filing under 35 U.S.C. 371 of International Application No. PCT/KR2015/011678, filed on Nov. 3, 2015, which claims the benefit of U.S. Provisional Application No. 62/075,269, filed on Nov. 5, 2014, 62/081,498, filed on Nov. 18, 2014, and 62/204,468, filed on Aug. 13, 2015, the contents of which are all hereby incorporated by reference herein in their entirety.

BACKGROUND OF THE INVENTION

Field of the Invention

The present invention relates to mobile communication.

Related Art

3rd generation partnership project (3GPP) long term evolution (LTE) that is an advancement of universal mobile telecommunication System (UMTS) is being introduced with 3GPP release 8. In 3GPP LTE, orthogonal frequency division multiple access (OFDMA) is used for downlink, and single carrier-frequency division multiple access (SC-FDMA) is used for uplink. The 3GPP LTE adopts multiple input multiple output (MIMO) having maximum four antennas. Recently, a discussion of 3GPP LTE-Advanced (LTE-A) which is the evolution of the 3GPP LTE is in progress.

As set forth in 3GPP TS 36.211 V10.4.0, the physical channels in 3GPP LTE may be classified into data channels such as physical downlink shared channel (PDSCH) and physical uplink shared channel (PUSCH) and control channels such as physical downlink control channel (PDCCH), physical control format indicator channel (PCFICH), physical hybrid-ARQ indicator channel (PHICH) and physical uplink control channel (PUCCH).

Meanwhile, in recent years, communication, i.e., machine type communication (MTC), occurring between devices or between a device and a server without a human interaction, i.e., a human intervention, is actively under research. The MTC refers to the concept of communication based on an existing wireless communication network used by a machine device instead of a user equipment (UE) used by a user.

Since the MTC has a feature different from that of a normal UE, a service optimized to the MTC may differ from a service optimized to human-to-human communication. In comparison with a current mobile network communication service, the MTC can be characterized as a different market scenario, data communication, less costs and efforts, a potentially great number of MTC devices, wide service areas, low traffic for each MTC device, etc.

As a way for decreasing the costs of an MTC device, the MTC device may use a reduced band only, that is, a sub-band.

However, when the mobile station operates only in a reduced band, i.e., a subband, rather than a system bandwidth of the cell, the MTC device can not correctly receive the existing PDCCH and the existing PHICH transmitted from the base station over the entire system band.

In particular, the PHICH is used to carry HARQ ACK/NACK for the uplink data transmitted by the MTC device, which is a problem because the MTC device can not receive the PHICH.

DETAILED DESCRIPTION OF THE INVENTION

Technical Problem

Accordingly, the disclosure of the specification has been made in an effort to solve the problem

Technical Solution

In order to accomplish the above object, the present disclosure provides a method of receiving a hybrid automatic repeat request (HARQ) acknowledgment (ACK)/non-acknowledgment (NACK) signal by a machine type communication (MTC) device. The method includes the steps of: the MTC device transmitting a physical uplink control channel (PUSCH) including uplink data; the MTC device determining a radio network temporary identifier (RNTI) for itself among a plurality of new RNTIs; monitoring reception of a downlink control channel within a search space; and receiving an HARQ ACK/NACK signal for transmission of the uplink data by decoding the downlink control channel scrambled with the determined RNTI.

In order to achieve the above object, the present disclosure also provides a machine type communication (MTC) device that receives a hybrid automatic repeat request (HARQ) acknowledgment (ACK)/non-acknowledgment (NACK) signal. The MTC device may determine an radio network temporary identifier (RNTI) for the MTC device itself among a plurality of new RNTIs and may monitor reception of a downlink control channel in a search space through the RF unit. The MTC device may include an RF unit for transmitting a physical uplink control channel (PUSCH) including uplink data; and a processor for receiving the HARQ ACK/NACK signal for transmission of the uplink data to transmit the determined RNTI by decoding the downlink control channel scrambled with the uplink control channel.

The downlink control channel may be repeatedly received on a plurality of subframes based on a predetermined repetition level.

The area in which the MTC device monitors the downlink control channel in the search space may be determined according to the repetition level.

The MTC device may determine its RNTI among the plurality of new RNTIs based on an upper layer signal received from the base station.

The MTC device may determine its RNTI among the plurality of new RNTIs based on its user equipment (UE) ID or C-RNTI.

The MTC device may determine its RNTI among the plurality of new RNTIs based on a location where the downlink control channel is received in the search space.

The MTC device may determine its RNTI among the plurality of new RNTIs based on the location of the resource that received the downlink control channel including the scheduling information for the PUSCH.

The MTC device may determine its RNTI among the plurality of new RNTIs based on the location of the resource on which the PUSCH was transmitted.

The MTC device may determine its own RNTI among the plurality of new RNTIs based on its own coverage extension level, repetition level of the downlink control channel, or repetition level of the PUSCH.

Advantageous Effects

According to embodiments of the present invention, the aforementioned problems of the existing technology will be solved.

BRIEF DESCRIPTION OF THE DRAWINGS

FIG. 6 illustrates the architecture of an uplink subframe in 3GPP LTE.

DETAILED DESCRIPTION OF THE INVENTION

Figure 1:
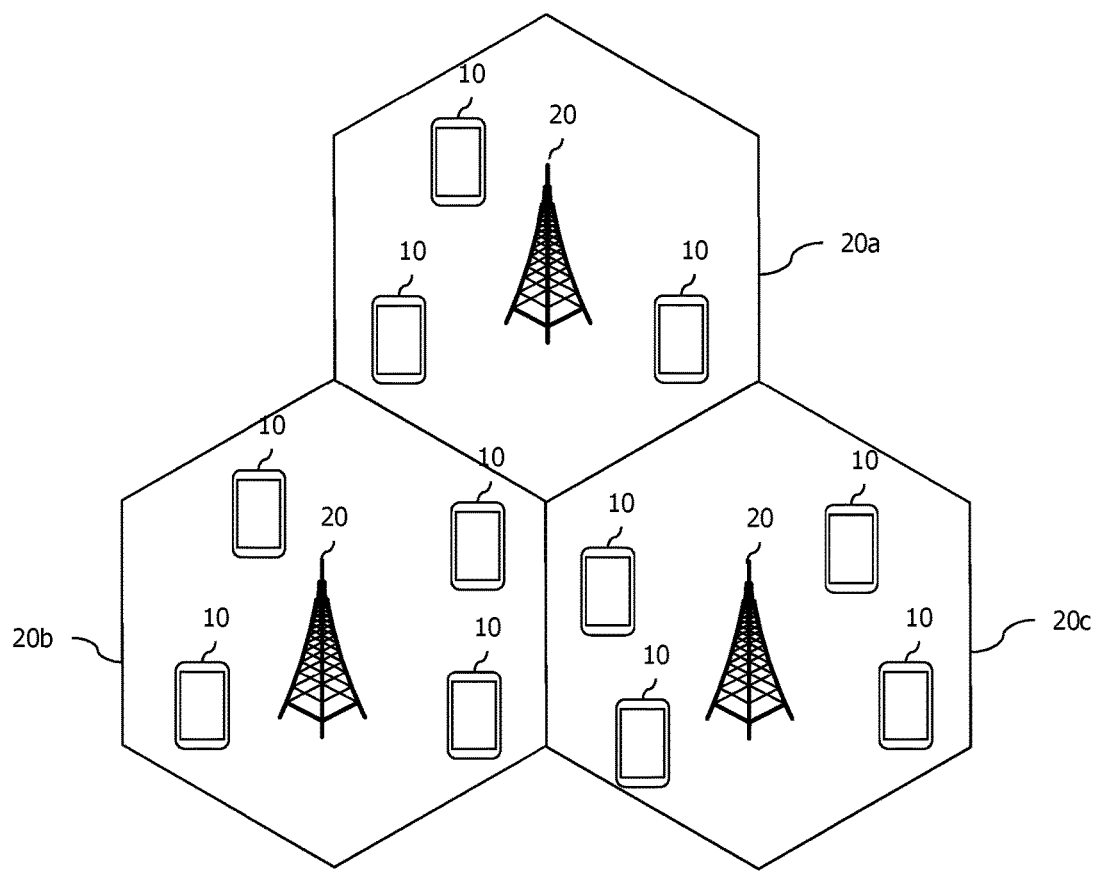
FIG. 1 illustrates a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

Further, the expression of the singular number in the present invention includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present invention, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being 'connected to' or 'coupled to' another element or layer, it can be directly connected or coupled to the other element or layer or intervening elements or layers may be present. In contrast, when an element is referred to as being 'directly connected' or 'directly coupled' to another element, there are no intervening elements.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

FIG. 1 illustrates a wireless communication system.

As seen with reference to FIG. 1, the wireless communication system includes at least one base station (BS) 20. Each base station 20 provides a communication service to specific geographical areas (generally, referred to as cells) 20*a*, 20*b*, and 20*c*. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE1 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a sub-frame, the uplink transmission and the downlink transmission are performed in different sub-frames.

Hereinafter, the LTE system will be described in detail.

Figure 2:
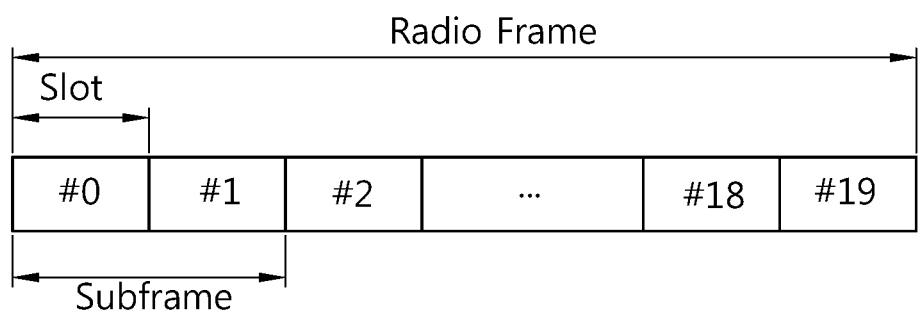
FIG. 2 illustrates the architecture of a radio frame according to frequency division duplex (FDD) of 3rd generation partnership project (3GPP) long term evolution (LTE).

FIG. 2 illustrates the architecture of a radio frame according to frequency division duplex (FDD) of 3rd generation partnership project (3GPP) long term evolution (LTE).

The radio frame of FIG. 2 may be found in the section 5 of 3GPP TS 36.211 V10.4.0 (2011-12) 'Evolved Universal Terrestrial Radio Access (E-UTRA); Physical Channels and Modulation (Release 10)'.

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). TTI is a scheduling unit for data transmission. For example, the length of one radio frame is 10 ms, the length of one sub-frame may be 1 ms, and the length of one slot may be 0.5 ms.

The structure of the radio frame is for exemplary purposes only, and thus the number of sub-frames included in the radio frame or the number of slots included in the sub-frame may change variously.

Meanwhile, one slot may include a plurality of orthogonal frequency division multiplexing (OFDM) symbols. The number of OFDM symbols included in one slot may vary depending on a cyclic prefix (CP). One slot includes 7 OFDM symbols in case of a normal CP, and one slot includes 6 OFDM symbols in case of an extended CP. Herein, since the 3GPP LTE uses orthogonal frequency division multiple access (OFDMA) in a downlink (DL), the OFDM symbol is only for expressing one symbol period in a time domain, and there is no limitation in a multiple access scheme or terminologies. For example, the OFDM symbol may also be referred to as another terminology such as a single carrier frequency division multiple access (SC-FDMA) symbol, a symbol period, etc.

Figure 3:
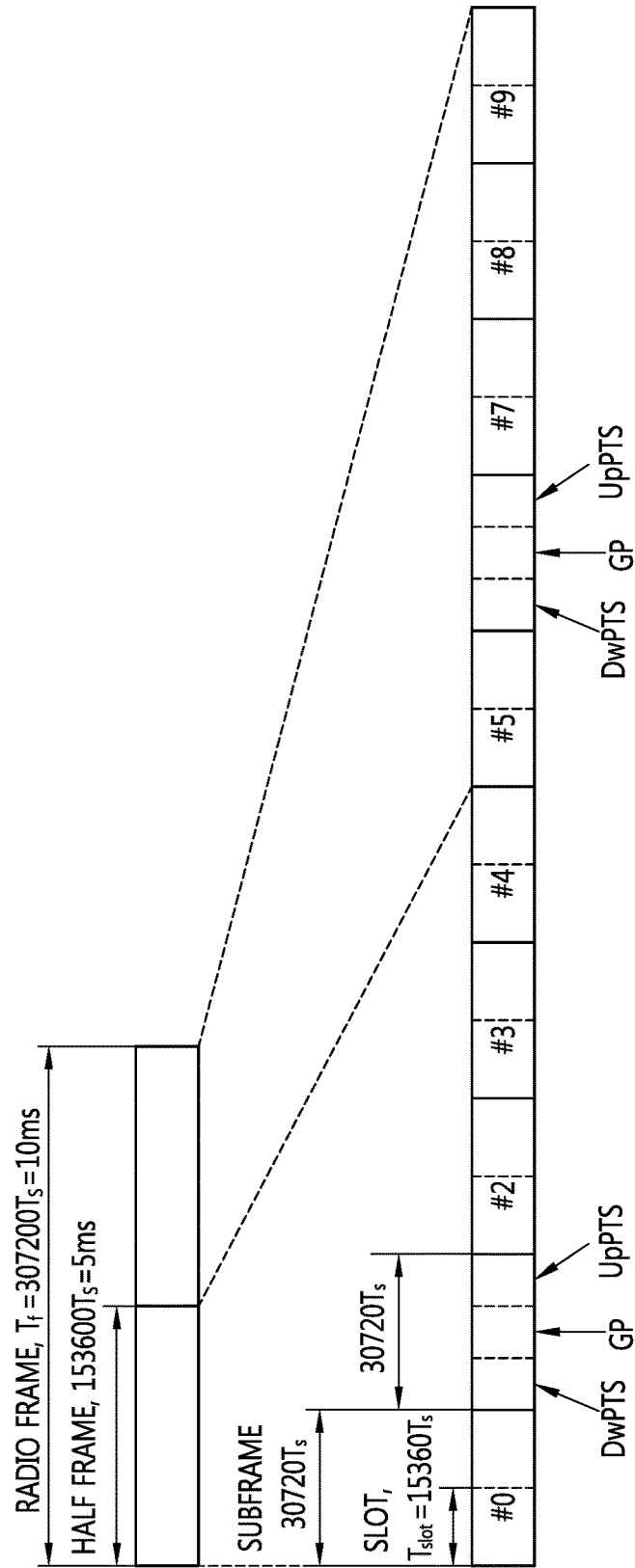
FIG. 3 illustrates the architecture of a downlink radio frame according to time division duplex (TDD) in 3GPP LTE.

FIG. 3 illustrates the architecture of a downlink radio frame according to time division duplex (TDD) in 3GPP LTE.

For this, 3GPP TS 36.211 V10.4.0 (2011-12) 'Evolved Universal Terrestrial Radio Access (E-UTRA); Physical Channels and Modulation (Release 8)', Ch. 4 may be referenced, and this is for TDD (time division duplex).

Sub-frames having index #1 and index #6 are denoted special sub-frames, and include a DwPTS (Downlink Pilot Time Slot: DwPTS), a GP (Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) sub-frame and a UL (Uplink) co-exist in one radio frame. Table 1 shows an example of configuration of a radio frame.

TABLE 1

| UL-DL configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL sub-frame, 'U' a UL sub-frame, and 'S' a special sub-frame. When receiving a UL-DL configuration from the base station, the terminal may be aware of whether a sub-frame is a DL sub-frame or a UL sub-frame according to the configuration of the radio frame.

TABLE 2

| Special subframe configuration | Normal CP in downlink | | | Extended CP in downlink | | |
|---|---|---|---|---|---|---|
| | | UpPTS | | | UpPTS | |
| | DwPTS | Normal CP in uplink | Extended CP in uplink | DwPTS | Normal CP in uplink | Extended CP in uplink |
| 0 | 6592*Ts | 2192*Ts | 2560*Ts | 7680*Ts | 2192*Ts | 2560*Ts |
| 1 | 19760*Ts | | | 20480*Ts | | |
| 2 | 21952*Ts | | | 23040*Ts | | |

TABLE 2-continued

| | Normal CP in downlink | | | Extended CP in downlink | | |
| --- | --- | --- | --- | --- | --- | --- |
| | | UpPTS | | | UpPTS | |
| Special subframe configuration | DwPTS | Normal CP in uplink | Extended CP in uplink | DwPTS | Normal CP in uplink | Extended CP in uplink |
| 3 | 24144*Ts | | | 25600*Ts | | |
| 4 | 26336*Ts | | | 7680*Ts | 4384*Ts | 5120*ts |
| 5 | 6592*Ts | 4384*Ts | 5120*ts | 20480*Ts | | |
| 6 | 19760*Ts | | | 23040*Ts | | |
| 7 | 21952*Ts | | | — | | |
| 8 | 24144*Ts | | | — | | |

Figure 4:
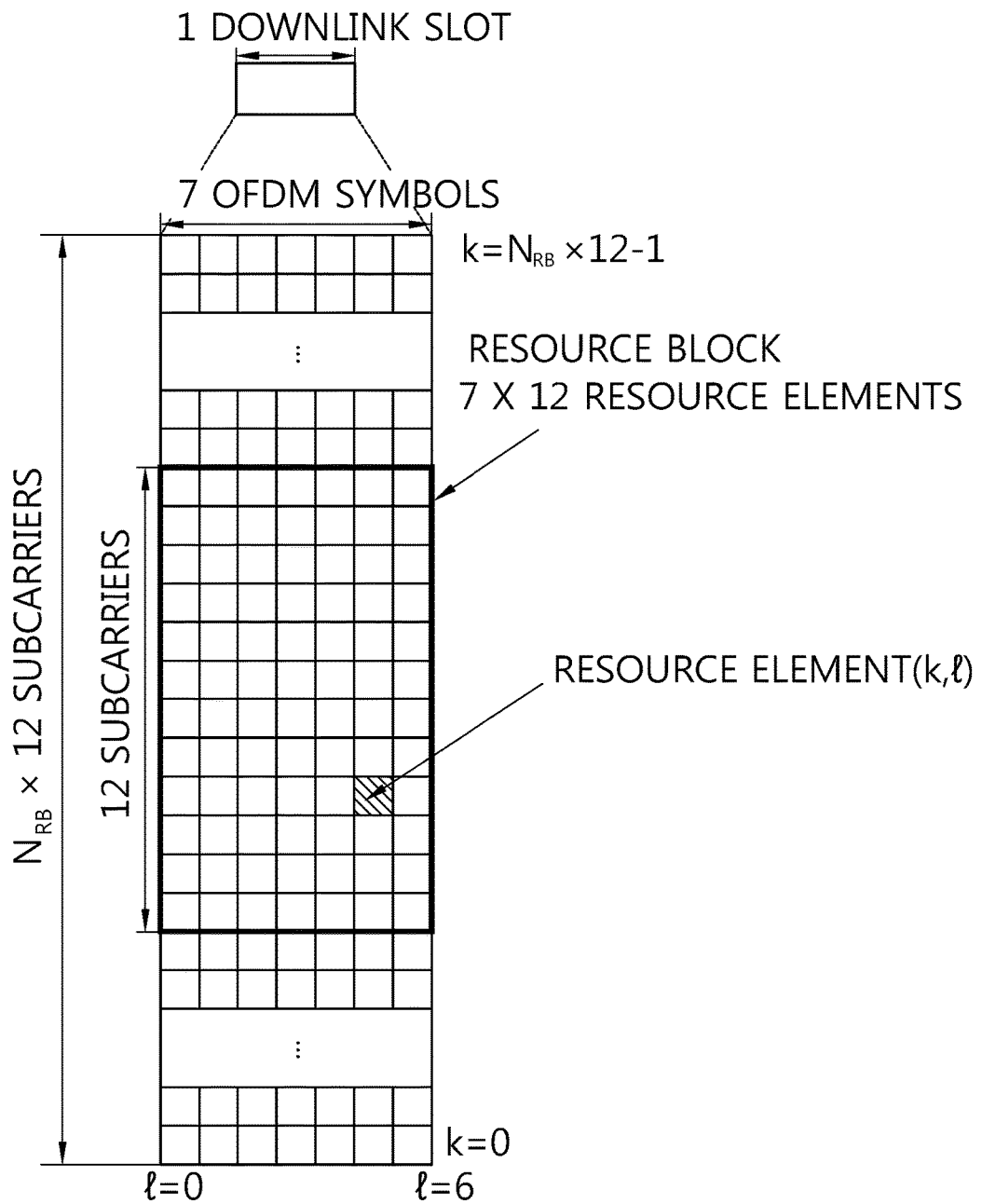
FIG. 4 illustrates an example resource grid for one uplink or downlink slot in 3GPP LTE.

FIG. 4 illustrates an example resource grid for one uplink or downlink slot in 3GPP LTE.

Referring to FIG. 4, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

The resource block is a unit of resource allocation and includes a plurality of sub-carriers in the frequency domain. For example, if one slot includes seven OFDM symbols in the time domain and the resource block includes 12 sub-carriers in the frequency domain, one resource block may include 7×12 resource elements (REs).

Meanwhile, the number of sub-carriers in one OFDM symbol may be one of 128, 256, 512, 1024, 1536, and 2048.

In 3GPP LTE, the resource grid for one uplink slot shown in FIG. 4 may also apply to the resource grid for the downlink slot.

Figure 5:
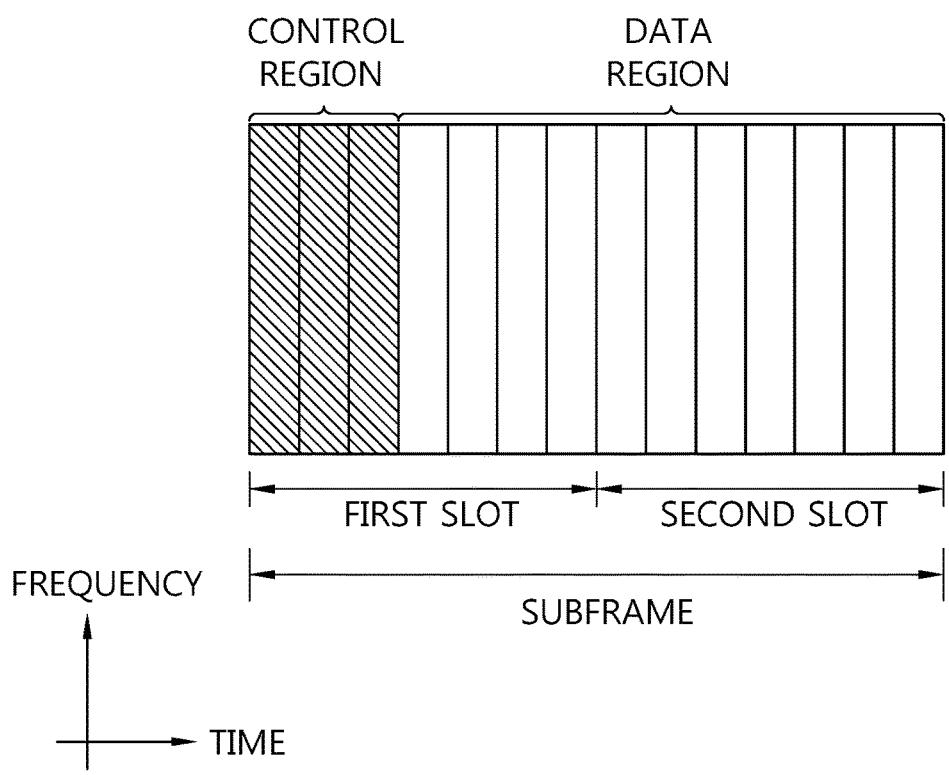
FIG. 5 illustrates the architecture of a downlink subframe.

FIG. 5 illustrates the architecture of a downlink subframe.

In FIG. 5, assuming the normal CP, one slot includes seven OFDM symbols, by way of example.

The DL (downlink) subframe is split into a control region and a data region in the time domain. The control region includes up to first three OFDM symbols in the first slot of the subframe. However, the number of OFDM symbols included in the control region may be changed. A PDCCH (physical downlink control channel) and other control channels are assigned to the control region, and a PDSCH is assigned to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

FIG. 6 illustrates the architecture of an uplink subframe in 3GPP LTE.

Referring to FIG. 6, the uplink subframe may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the subframe. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The terminal may obtain a frequency diversity gain by transmitting uplink control information through different sub-carriers over time. m is a location index that indicates a logical frequency domain location of a resource block pair assigned to the PUCCH in the subframe.

The uplink control information transmitted on the PUCCH includes an HARQ (hybrid automatic repeat request), an ACK (acknowledgement)/NACK (non-acknowledgement), a CQI (channel quality indicator) indicating a downlink channel state, and an SR (scheduling request) that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Or, the uplink data may be multiplexed data. The multiplexed data may be data obtained by multiplexing the transport block for the UL-SCH and control information. For example, the control information multiplexed with the data may include a CQI, a PMI (precoding matrix indicator), an HARQ, and an RI (rank indicator). Or, the uplink data may consist only of control information.

<Hybrid Automatic Repeat Request (HARQ)>

When a frame is not received or damaged when data is exchanged between a base station and a UE, an error control method may include an automatic repeat request (ARQ) method and a more advanced hybrid ARQ (HARQ) method. The ARQ method may wait for an acknowledgment (ACK) message to arrive after one frame transmission and may send an acknowledgment (ACK) message only when the receiving side correctly receives the acknowledgment message. The ARQ method may send a negative ACK (NACK) message when an error occurs in the frame, and an erroneous received frame may erase its information from the receiver buffer. When the ACK signal is received from the transmitting side, the frame may be transmitted afterwards, but when receiving the NACK message, the frame may be retransmitted.

Unlike the ARQ scheme, in the case where the received frame can not be demodulated, the receiving side may transmit a NACK message to the transmitting side, but the already received frame may be stored in the buffer for a predetermined period of time. When the frame is retransmitted, it may combine with the received frame to increase the reception success rate.

In recent years, a more efficient HARQ scheme than the ARQ scheme has been widely used. There are many kinds of HARQ schemes. The HARQ scheme may be classified into synchronous HARQ and asynchronous HARQ according to retransmission timing, and the HARQ scheme may be classified into a channel-adaptive scheme and a channel-non-adaptive scheme depending on whether the channel state is reflected on the amount of resources used in retransmission.

Figure 7:
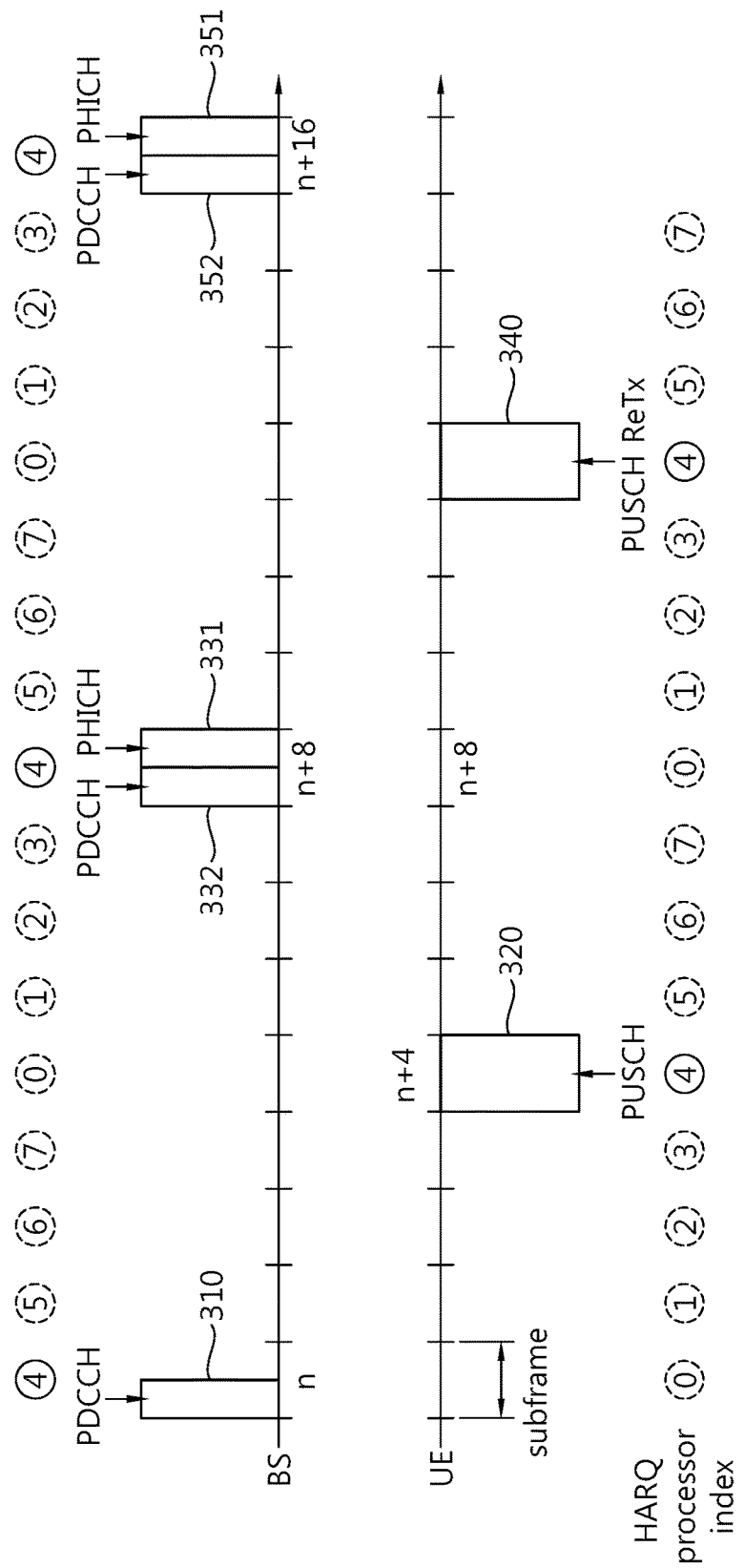
FIG. 7 illustrates a synchronous HARQ.

FIG. 7 illustrates a synchronous HARQ.

The synchronous HARQ scheme is a scheme in which, when the initial transmission fails, subsequent retransmissions is performed at a timing determined by the system. That is, assuming that the timing at which retransmission occurs is made every 8th time unit (subframe) after the initial transmission, it is not necessary to notify the timing further because an appointment has already been made between the base station and the UE. However, when the NACK message is received from the data sender, the data is retransmitted every 8th time until receiving the ACK message.

The UE may transmit a UL transport block on the PUSCH 320 using the initial UL grant in the (n+4)th subframe.

The base station may send an ACK/NACK signal for the UL transport block onto the PHICH 331 in the (n+8)th subframe. The ACK/NACK signal indicates reception acknowledgment for the UL transport block. The ACK signal indicates reception success and the NACK signal indicates reception failure. When the ACK/NACK signal is a NACK signal, the base station may send a retransmission UL grant on the PDCCH 332, or may not send a separate UL grant. Alternatively, it may be possible to stop retransmission of the previous data and transmit a UL grant for transmission of new data. When it is an ACK signal, the base station may transmit a UL grant for a new transmission on the PDCCH. Also, the base station may transmit a UL grant (retransmission UL grant) for retransmission. When receiving a retransmission UL grant, the UE may ignore the ACK/NACK signal and may follow the indication of the retransmission UL grant. This is because the ACK/NACK signal has a CRC when there is no CRC and there is a UL grant, and the reliability of the UL grant is higher.

In this case, upon receiving the NACK signal without receiving the UL grant, the wireless (or radio) device sends a retransmission block on the PUSCH 340 in the (n+12)th subframe. Upon receiving the retransmission UL grant on the PDCCH 332 for the transmission of the retransmission block, the wireless device may use the received retransmission UL grant. When retransmission UL grant is not received, the previously received UL grant may be used for the same HARQ process.

The base station may send an ACK/NACK signal for the UL transmission block on the PHICH 351 in the (n+16)th subframe. When the ACK/NACK signal is a NACK signal, the base station may send a retransmission UL grant on the PDCCH 352, or may not send a separate UL grant.

Since the retransmission is performed in the (n+12)th subframe after the initial transmission in the (n+4)th subframe, synchronous HARQ may be executed for 8 subframes as the HARQ period.

Figure 8:
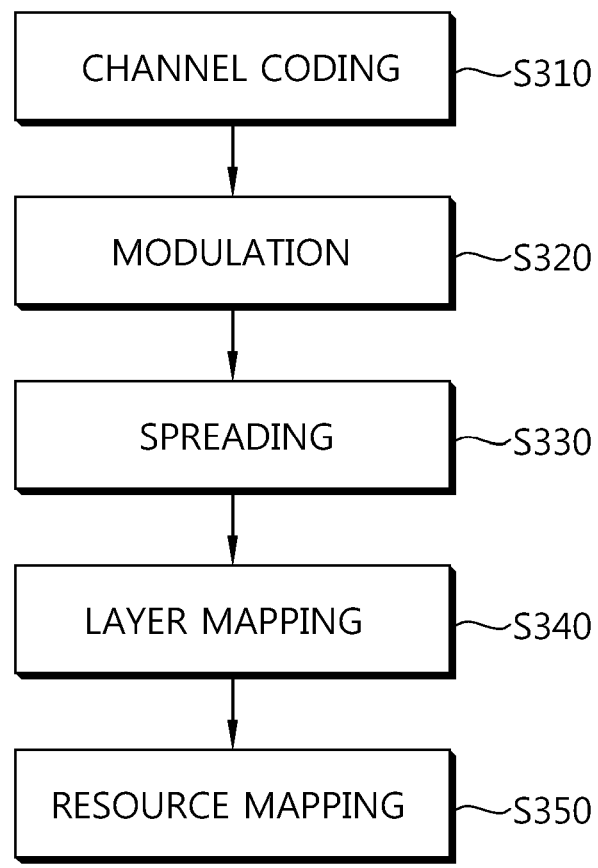
FIG. 8 is a block diagram illustrating the configuration of a PHICH in 3GPP LTE.

FIG. 8 is a block diagram illustrating the configuration of a PHICH in 3GPP LTE.

One PHICH may transmit only the PUSCH of a single UE, that is, 1 bit ACK/NACK of one stream.

In step S310, 1 bit ACK/NACK may be coded into 3 bits by using the repetition code whose code rate is 1/3.

In step S320, the encoded ACK/NACK may be modulated by the binary phase key-shifting (BPSK) method to generate three modulation symbols.

In step S330, the modulation symbols may be spread using an orthogonal sequence. In normal CP, spreading factor (SF) $N^{PHICH}_{SF}=4$. In expanded CP, NPHICHSF=2.

The number of orthogonal sequences used may be $N^{PHICH}_{SF}*2$ to apply I/Q multiplexing. PHICHs spread using NPHICHSF*2 orthogonal sequences may be defined as one PHICH group.

The following table shows the orthogonal sequence for PHICH.

TABLE 3

| Sequence index | Orthogonal sequence | |
|---|---|---|
| $n^{seq}$PHICH | Normal CP ($N^{PHICH}_{SF}$ = 4) | Extended CP ($N^{PHICH}_{SF}$ = 2) |
| 0 | [+1 +1 +1 +1] | [+1 +1] |
| 1 | [+1 −1 +1 −1] | [+1 −1] |
| 2 | [+1 +1 −1 −1] | [+j +j] |
| 3 | [+1 −1 −1 +1] | [+j −j] |
| 4 | [+j +j +j +j] | — |
| 5 | [+j −j +j −j] | — |
| 6 | [+j +j −j −j] | — |
| 7 | [+j −j −j +j] | — |

In step S340, layer mapping may be performed on the spread symbols.

In step S350, the layer mapped symbols may be mapped and transmitted.

A plurality of PHICHs mapped to the same set of resource elements may form a PHICH group, and each PHICH in the PHICH group may be divided by a different orthogonal sequence. In frequency division duplex (FDD), the number of PHICH groups $N^{group}_{PHICH}$ is constant in all subframes and is given by the following equation.

$$N^{group}_{PHICH} = \begin{cases} \lceil N_g(N^{DL}_{RB}/8) \rceil & \text{for normal cyclic prefix} \\ 2 \cdot \lceil N_g(N^{DL}_{RB}/8) \rceil & \text{for extended cyclic prefix} \end{cases} \quad \text{[Equation 1]}$$

Here, Ng is a parameter transmitted on a physical broadcast channel (PBCH), and Ng∈{1/6, 1/2, 1, 2}. $N^{DL}_{RB}$ indicates the number of downlink RBs. Ceil (x) is a function that outputs the minimum value among integers greater than or equal to x. Floor (x) is a function that outputs the maximum value among integers less than or equal to x.

The wireless (or radio) device identifies the PHICH resource used by the PHICH by index pair ($n^{group}_{PHICH}$, $n^{seq}_{PHICH}$). The index $n^{group}_{PHICH}$ of the PHICH group has a value between 0 and NgroupPHICH-1. The orthogonal sequence index nseqPHICH indicates the index of the orthogonal sequence.

An index pair (ngroupPHICH, nseqPHICH) is obtained as follows.

$$n_{PHICH}^{group} = (I_{PRB\_RA}^{lowest\_index} + n_{DMRS}) \bmod N^{group}_{PHICH} + I_{PHICH} N^{group}_{PHICH}$$

$$n_{PHICH}^{seq} = (\lfloor I_{PRB\_RA}^{lowest\_index}/N^{group}_{PHICH} \rfloor + n_{DMRS}) \bmod 2N^{PHICH}_{SF} \quad \text{[Equation 2]}$$

Here, the $n_{DMRS}$ indicates the cyclic shift of the demodulation reference signal (DMRS) in the most recent UL grant for the transport block associated with the corresponding PUSCH transmission. The DMRS is an RS used for PUSCH transmission. $N^{PHICH}_{SF}$ is the SF size of the orthogonal sequence used for PHICH modulation. $I^{lowest\_index}_{PRB\_RA}$ is the minimum physical resource block (PRB) index in the first slot of the corresponding PUSCH transmission. $I_{PHICH}$ is a value of 0 or 1.

A physical resource block ('PRB') indicates a unit frequency-time resource for transmitting data. One PRB is composed of a plurality of REs continuous in the frequency-time domain, and the following RB and PRB are used with the same concept.

In a wireless (or radio) frame used for time division duplex (TDD), the number of PHICH groups may be variously changed between downlink subframes. The number of PHICH groups may be given to $m_i \cdot N^{group}_{PHICH}$ and $m_i$ may be given as the following table. Then, the $N^{group}_{PHICH}$ is given by Equation 1 above, and the index $n^{group}_{PHICH}$ for the downlink subframe having the PHICH resource has a range from 0 to $m_i \cdot N^{group}_{PHICH} - 1$.

TABLE 4

| UL-DL setting | Subframe number i | | | | | | | | | |
| --- | --- | --- | --- | --- | --- | --- | --- | --- | --- | --- |
| | 0 | 1 | 2 | 3 | 4 | 5 | 6 | 7 | 8 | 9 |
| 0 | 2 | 1 | 0 | 0 | 0 | 2 | 1 | 0 | 0 | 0 |
| 1 | 0 | 1 | 0 | 0 | 1 | 0 | 1 | 0 | 0 | 1 |
| 2 | 0 | 0 | 0 | 1 | 0 | 0 | 0 | 0 | 1 | 0 |
| 3 | 1 | 0 | 0 | 0 | 0 | 0 | 0 | 0 | 1 | 1 |
| 4 | 0 | 0 | 0 | 0 | 0 | 0 | 0 | 0 | 1 | 1 |
| 5 | 0 | 0 | 0 | 0 | 0 | 0 | 0 | 0 | 1 | 0 |
| 6 | 1 | 1 | 0 | 0 | 0 | 1 | 1 | 0 | 0 | 1 |

Meanwhile, the duration of the PHICH may be set by the upper layer and may be set as shown in the following table.

TABLE 5

| PHICH duration | Non-MBSFN subframe | | MBSFN subframe on carrier supporting PDSCH |
| --- | --- | --- | --- |
| | For TDD, subframes 1 and 6 | All different cases | |
| Normal CP | 1 | 1 | 1 |
| Extended CP | 2 | 3 | 2 |

<Carrier Aggregation>

Hereinafter, a carrier aggregation (CA) system will be described.

The CA system refers to aggregate a plurality of component carriers (CCs). Due to CA, the meaning of a legacy cell has been changed. According to CA, a cell may refer to a combination of a downlink (DL) CC and an uplink (UL) CC or a single DL CC.

Also, in CA, a cell may be classified as a primary cell, a secondary cell, and a serving cell. The primary cell refers to a cell operating in a primary frequency and refers to a cell in which a UE performs an initial connection establishment procedure or a connection re-establishment procedure with a BS (or an eNB) or a cell indicated as a primary cell during a handover procedure. The secondary cell refers to a cell operating in a secondary frequency, which is configured once RRC connection is established and which is used to provide additional wireless resource.

As mentioned above, in the CC system, a plurality of CCs, i.e., a plurality of serving cells, may be supported, unlike a single carrier system.

Such carrier aggregation system may support cross-carrier scheduling. The cross-carrier scheduling is a scheduling scheme that may conduct resource allocation of a PUSCH transmitted through other component carriers than the component carrier basically linked to a specific component carrier and/or resource allocation of a PDSCH transmitted through other component carriers through a PDCCH transmitted through the specific component carrier.

<EPDCCH(Enhanced Physical Downlink Control Channel)>

Meanwhile, a PDCCH is monitored in a limited area called a control area within a subframe, and a CRS transmitted in the entire band is used to demodulate the PDCCH. As types of control information is varied and an amount of control information is increased, flexibility of scheduling is lowered only by the legacy PDCCH. Also, in order to reduce a burden of CRS transmission, an enhanced PDCCH (EPDCCH) has been introduced.

Figure 9:
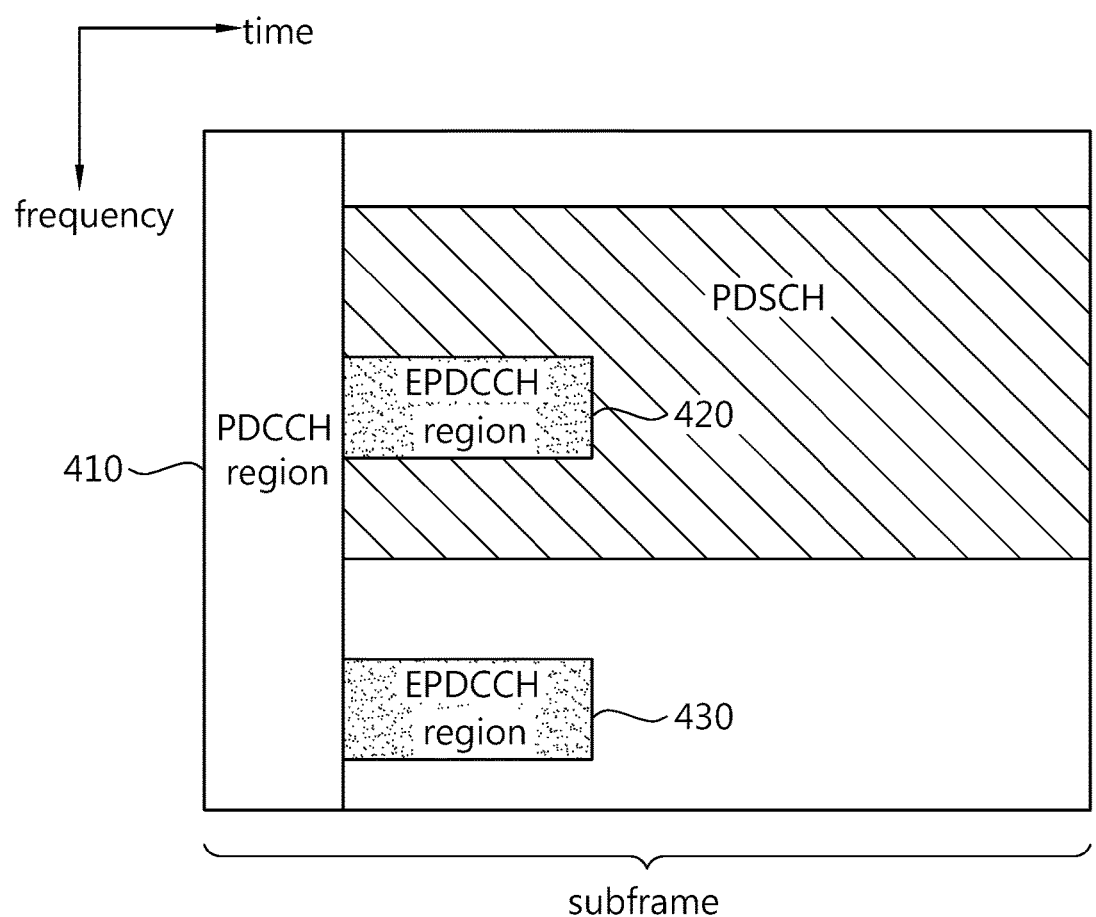
FIG. 9 illustrates an example of a subframe having an EPDCCH.

FIG. 9 illustrates an example of a subframe having an EPDCCH.

A subframe may include zero or one PDCCH region 410 and zero or more EPDCCH regions 420 and 430.

The EPDCCH regions 420 and 430 are regions in which a wireless device monitors an EPDCCH. The PDCCH region 410 is positioned within a maximum of four front OFDM symbols of the subframe, while the EPDCCH regions 420 and 430 may be flexibly scheduled in OFDM symbols after the PDCCH region 410.

One or more EPDCCH regions 420 and 430 are designated in a wireless device, and the wireless device may monitor an EPDCCH in the designated EPDCCH regions 420 and 430.

The number/position/size of the EPDCCH regions 420 and 430 and/or information regarding a subframe for monitoring the EPDCCH may be provided by a BS to the wireless device through an RRC message, or the like.

In the PDCCH region 410, a PDCCH may be demodulated on the basis of a CRS. In the EPDCCH regions 420 and 430, a demodulation (DM) RS, not the CRS, may be defined to demodulate the EPDCCH. An associated DM RS may be transmitted in the corresponding EPDCCH regions 420 and 430.

The EPDCCH regions 420 and 430 may each be used in scheduling for different cells. For example, an EPDCCH within the EPDCCH region 420 may carry scheduling information for a primary cell, and an EPDCCH within the EPDCCH region 430 may carry scheduling information for a secondary cell.

When an EPDCCH is transmitted in the EPDCCH regions 420 and 430 through multiple antennas, the same precoding as that of the EPDCCH may be applied to a DMRS within the EPDCCH regions 420 and 430.

Compared with a PDCCH which uses a CCE as a transmission resource unit, a transmission resource unit for an EPCCH is called an enhanced control channel element (ECCE). An aggregation level may be defined by a resource unit for monitoring an EPDCCH. For example, when 1 ECCE is a minimum resource for an EPDCCH, the aggregation level may be defined as L={1, 2, 4, 8, 16}.

Hereinafter, an EPDCCH search space may correspond to an EPDCCH region. In the EPDCCH search space, one or more EPDCCH candidates may be monitored at every one or more aggregation levels.

<Machine Type Communication (MTC) Communication>

Meanwhile, the MTC will be described below.

Figure 10A:
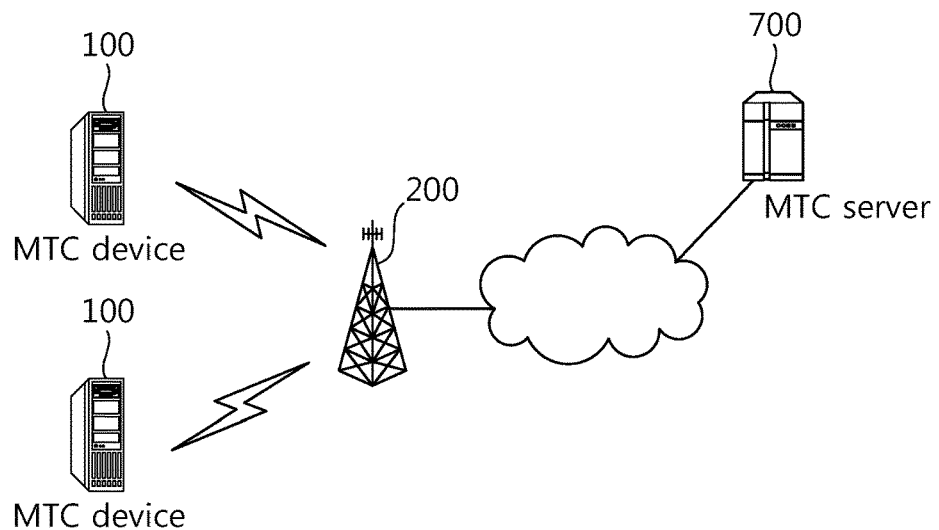
FIG. 10A shows an example of machine type communication (MTC) communication.

FIG. 10A shows an example of machine type communication (MTC) communication.

The machine type communication (MTC) is an information exchange between MTC devices 100 without human interaction through the base station 200 or between the MTC device 100 and the MTC server 700 via the base station.

The MTC server 700 may be an entity communicating with the MTC device 100. The MTC server 700 may execute the MTC application and may provide MTC specific service to the MTC device 100.

The MTC device 100 may be a wireless device that provides MTC communication, and may be fixed or movable.

The service provided through MTC may be different from the service in the existing human intervention communication and the service may have various kinds of services such as tracking, metering, payment, medical service, and remote control. More specifically, services provided through the MTC may include meter reading, water level measurement, utilization of surveillance cameras, inventory reporting of vending machines, and the like.

Since the specificity of the MTC device is small and the transmission/reception of the uplink/downlink data occurs occasionally, it may be effective to lower the cost of the MTC device and reduce the battery consumption in accordance with the low data rate. These MTC devices may be characterized by low mobility, and thus have characteristics that the channel environment hardly changes.

Meanwhile, the MTC is also called internet of things (IoT). Accordingly, the MTC device may be called an IoT device.

Figure 10B:
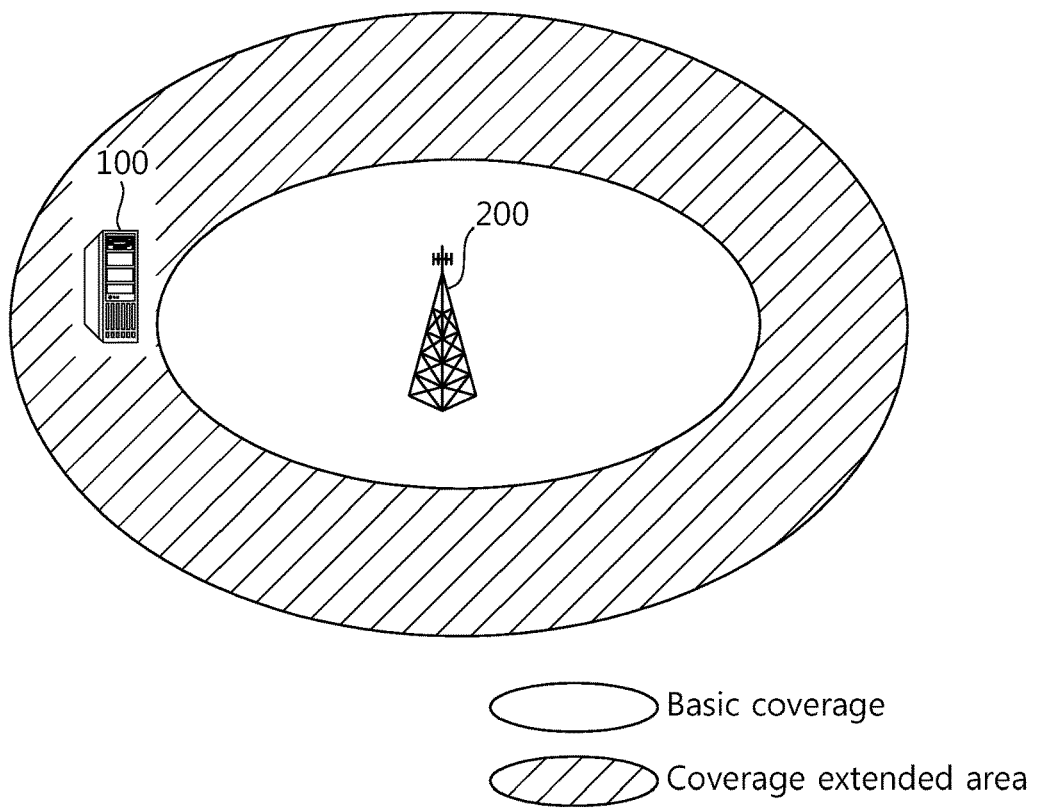
FIG. 10B is an illustration of cell coverage extension for an MTC device.

FIG. 10B is an illustration of cell coverage extension for an MTC device.

In recent years, considering expanding the cell coverage of the base station for the MTC device 100, various techniques for expanding the cell coverage have been discussed.

However, when the coverage of the cell is expanded, in the case where the base station transmits the downlink channel to the MTC device located in the coverage extension area, the MTC device may have difficulty in receiving the downlink channel.

Figure 10C:
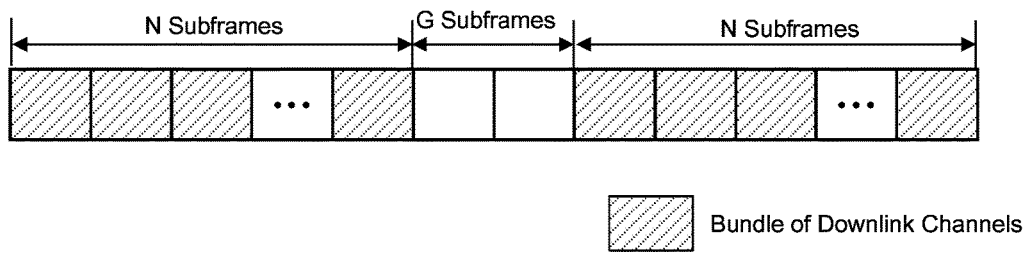
FIG. 10C is an exemplary diagram illustrating an example of transmitting a bundle of downlink channels.

FIG. 10C is an exemplary diagram illustrating an example of transmitting a bundle of downlink channels.

As known by referring to FIG. 10C, the base station may repeatedly transmit a downlink channel (e.g., a PDCCH and/or a PDSCH) to the MTC device 100 located in the coverage extension area to a plurality of subframes (e.g., N subframes). As described above, the downlink channels repeated on the plurality of subframes are referred to as a bundle of downlink channels.

Meanwhile, the MTC device may increase the decoding success rate by receiving a bundle of downlink channels on a plurality of subframes and decoding some or all of the bundles.

Likewise, the MTC device located in the coverage extension area may also transmit a bundle of uplink channels (e.g., PUCCH and/or PUSCH) on the plurality of subframes to the base station.

Figure 11A:
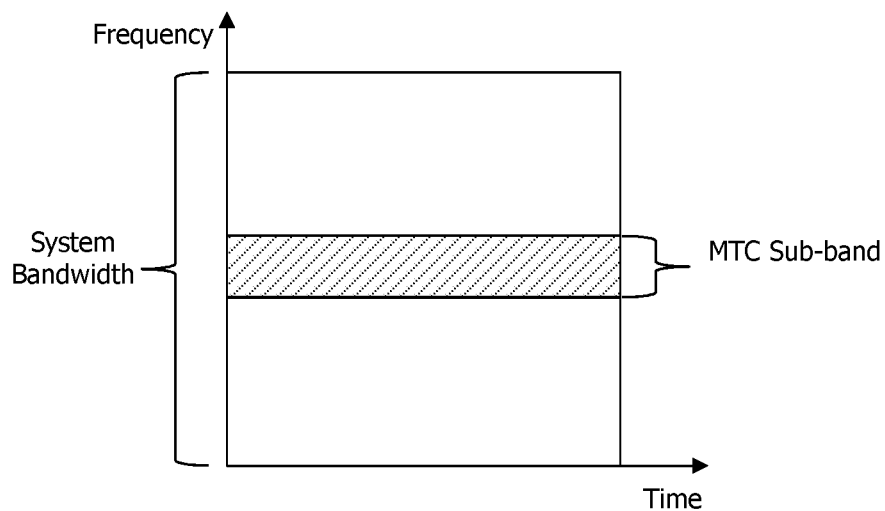
FIGS. 11A and 11B are diagrams illustrating examples of sub-bands in which the MTC device operates.
Figure 11B:
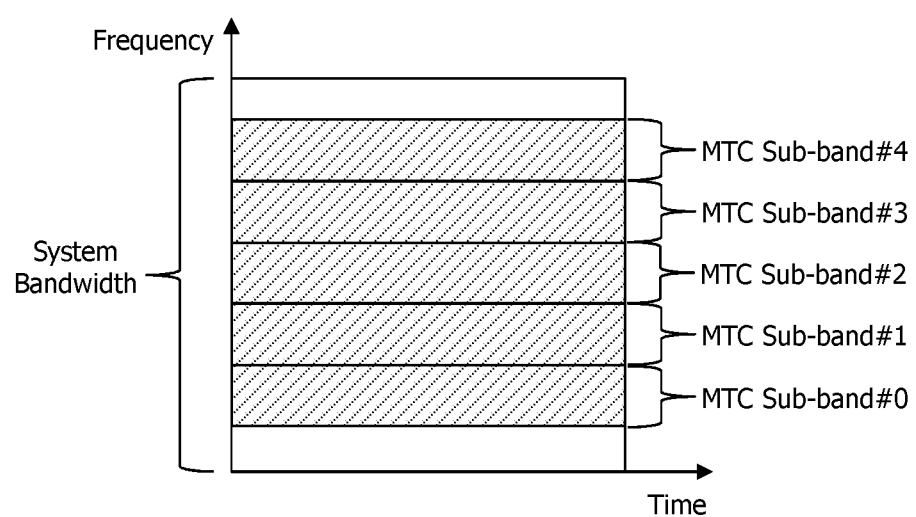

FIGS. 11A and 11B are diagrams illustrating examples of sub-bands in which the MTC device operates.

As an alternative method to the low cost of the MTC device, the MTC device may use sub-bands of, for example, about 1.4 MHz, irrespective of the system bandwidth of the cell as shown in FIG. 11A.

At this time, the area of the subband in which such an MTC device operates may be located in a central region (e.g., six center PRBs) of the system bandwidth of the cell as shown in FIG. 11A.

Alternatively, as shown in FIG. 11B, a plurality of subbands of the MTC device may be arranged in one subframe for multiplexing within the subframe between the MTC devices, and different subbands may be used between the MTC device. At this time, most of the MTC devices may use other subbands than the central region (e.g., six center PRBs) of the system band of the cell.

However, in the center region (e.g., six center PRBs) of the system band of the cell, a common channel/signal is transmitted in the cell.

Accordingly, in the case where the area of the subband where the MTC device operates is not the central region (e.g., six center PRBs) of the system band of the cell, the MTC device may not receive the cell common channel/signal.

Also, the MTC device may not correctly receive the existing PDCCH transmitted from the base station in the entire system band. Also, on considering multiplexing with PDCCHs transmitted to other common UEs, it may be undesirable for a cell to transmit a PDCCH for an MTC device in an OFDM symbol region where an existing PDCCH is transmitted.

Likewise, the MTC device may not appropriately receive the existing PHICH transmitted from the base station in the entire system band.

On the other hand, when the amount of traffic for the MTC device is small, the base station may allocate only a band (for example, a band frequency region) smaller than the subbands shown in FIGS. 10A and 10B, equal to or smaller than the size of one RB. It may be efficient to set the band on the MTC device. This will also be explained with reference to FIGS. 12A and 12B.

Figure 12A:
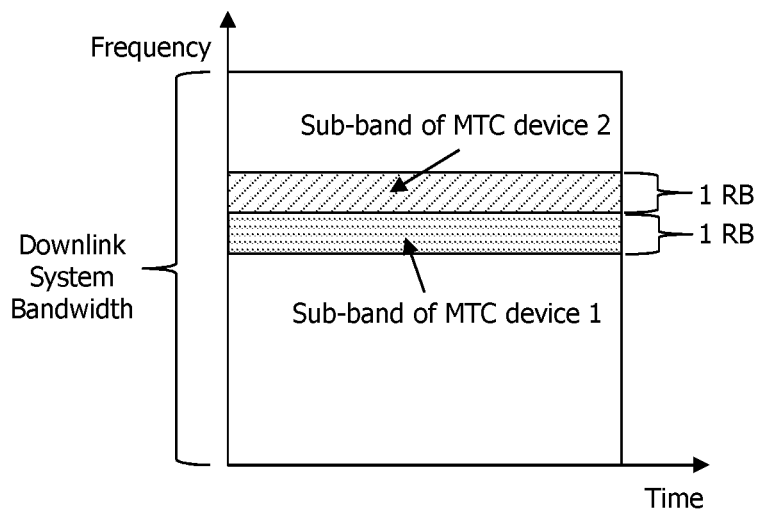
FIG. 12A shows an example of setting the subband of the MTC device to one RB size.
Figure 12B:
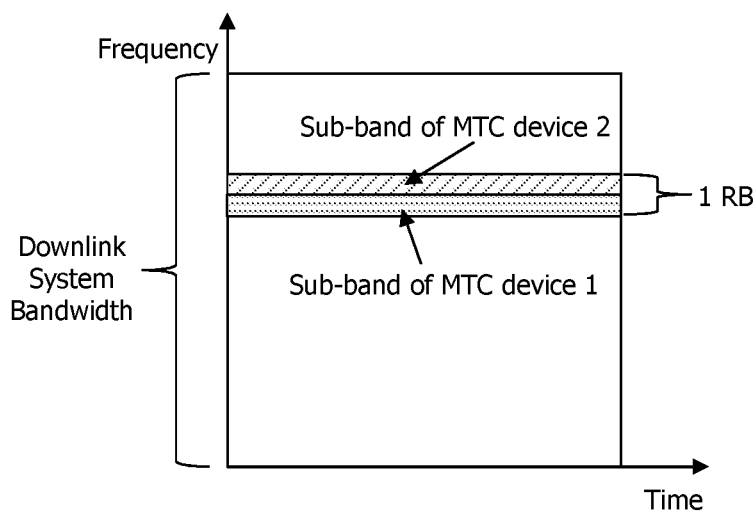
FIG. 12B shows an example of setting the subband of the MTC device to one half of the RB size.

FIG. 12A shows an example of setting the subband of the MTC device to one RB size, and FIG. 12B shows an example of setting the subband of the MTC device to one half of the RB size.

As seen with reference to FIG. 12A, subbands of one RB size may be set for the MTC device 1 and the MTC device 2, respectively.

Also, as seen with reference to FIG. 11B, one RB may be divided and set for the MTC device 1 and the MTC device 2, respectively.

In such a situation, the MTC device may not properly receive the existing PDCCH transmitted from the base station in the entire system band, and the existing PHICH.

<Disclosure of the Present Specification>

Accordingly, the disclosure of the present specification aims to provide a solution to solve such problems.

Specifically, as one way to solve the above-mentioned problems, the disclosure of the present disclosure proposes the introduction of a new downlink control channel transmitted in a sub-band where an MTC device operates.

In addition, as one way to solve the above-mentioned problems, the disclosure of the present disclosure proposes the introduction of a new PHICH (hereinafter, referred to as enhanced PHICH or EPHICH) transmitted within a sub-band where the MTC device operates.

Hereinafter, for descriptive convenience, the contents of the invention will be described based on the MTC device or the MTC device for which coverage enhancement is required, but the disclosure of the present disclosure may be also applicable to other common UEs.

I. Method to Include ACK/NACK Signal in EPDCCH (Introduction of a New DCI Format).

The base station may transmit the EPHICH (ACK/NACK signal for PUSCH transmission) for the MTC device through the EPDCCH in the form of a specific DCI format unlike the conventional one. For example, it is possible to transmit using the new DCI format including a HARQ ACK/NACK indication (hereinafter, referred to as HI) signal by using the EPDCCH set of distributed transmission.

For convenience of explanation, the DCI containing the 'ACK/NACK information for PUSCH transmission' of the MTC device may be referred to as HI-DCI. At this time, the HI-DCI may be transmitted through the EPDCCH of the CSS region or through the EPDCCH of the USS region.

I-1. Determination of Scramble ID

When the HI-DCI (ACK/NACK information for PUSCH transmission) for the MTC device is transmitted through the EPDCCH, the scrambling ID of the corresponding EPDCCH and the number/position of the EPDCCH scrambled with the scrambling ID may be as follows.

I-1-1. Introduction of New Radio Network Temporary Identifier (RNTI)

When the HI-DCI for the MTC device is transmitted through the EPDCCH, the MTC device needs to introduce a new RNTI so as to know that the EPDCCH includes the HI-DCI.

Specifically, the base station may scramble EPDCCH including the HI-DCI based on a specific new RNTI in a resource area (CSS or USS region) where the MTC device can receive the HI-DCI, and then may transmit the scrambled EPDCCH. Accordingly, the MTC device may descramble the EPDCCH with the new RNTI value, and then attempt decoding the EPDCCH to determine that the corresponding EPDCCH is the EPDCCH containing the HI-DCI.

In this case, only one ACK/NACK information for one MTC device may be contained in one HI-DCI. Alternatively, the HI-DCI may contain ACK/NACK information for a plurality of MTC devices.

The EPDCCH scrambled with the new RNTI may exist only one in the resource area (CSS or USS region) for receiving the HI-DCI by the MTC device. In this case, the HI-DCI may contain ACK/NACK information for all MTC devices to receive ACK/NACK information at the corresponding time. In this case, each MTC device may determine the location where the EPDCCH scrambled with the new RNTI is transmitted according to the contents described in the following section I-2.

Alternatively, a plurality of EPDCCH scrambled with the new RNTI may exist in the resource area (CSS or USS region) where the MTC device can receive the HI-DCI. In this case, one HI-DCI may contain ACK/NACK information for one or a plurality of MTC devices. At this time, the ACK/NACK information for each MTC device may be transmitted through one of the plurality of EPDCCHs scrambled with the new RNTI. In this case, each MTC device may determine whether the ACK/NACK information for the PUSCH transmitted through one EPDCCH among a plurality of EPDCCHs scrambled with the new RNTI is transmitted according to the contents described in the following section I-2.

I-1-2. Multiple new RNTI

In the resource area (CSS or USS region) where the MTC device can receive the HI-DCI, the EPDCCH including the HI-DCI may be scrambled based on one of a plurality of new RNTIs. Accordingly, the MTC device may determine that the corresponding EPDCCH is the EPDCCH including the HI-DCI by descrambling the EPDCCH with any one RNTI value for a plurality of new RNTIs and attempting decoding the EPDCCH. For the sake of understanding, the following description will be made with reference to the drawings.

Figure 13:
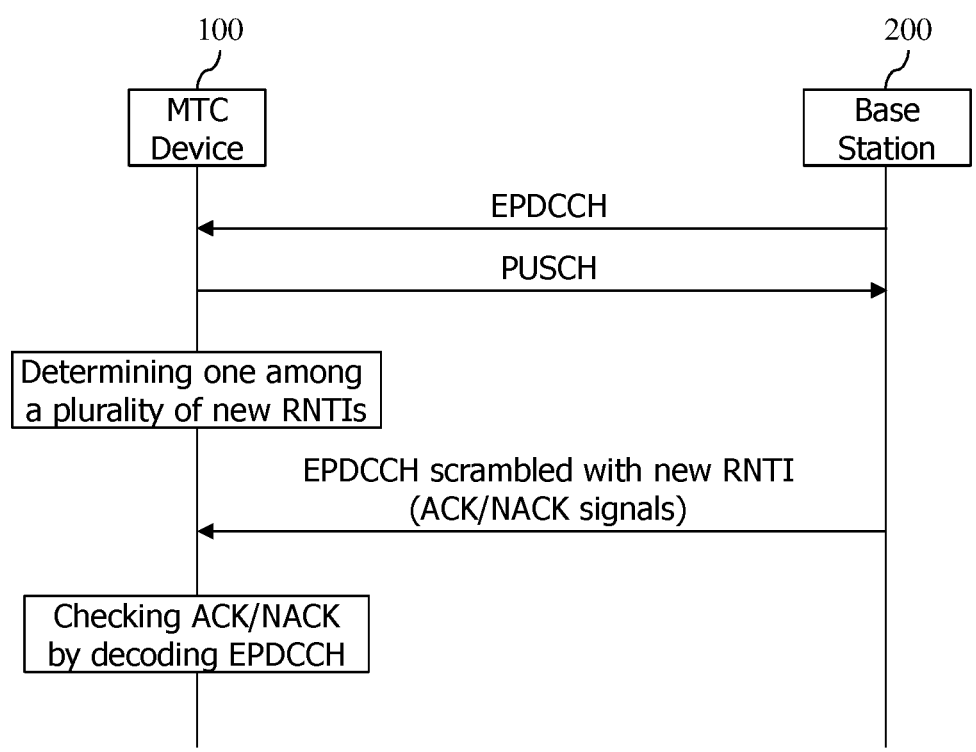
FIG. 13 shows an example in which ACK/NACK is included in an EPDCCH scrambled with one of a plurality of new RNTIs.

FIG. 13 shows an example in which ACK/NACK is included in an EPDCCH scrambled with one of a plurality of new RNTIs.

Referring to FIG. 13, the MTC 100 may receive an EPDCCH including scheduling information for a PUSCH from the base station 200. Next, the MTC device 100 may transmit a PUSCH including uplink data based on the scheduling information.

Then, the MTC device 100 may determine an RNTI for itself among a plurality of new RNTIs.

Then, The MTC device 100 may monitor the reception of the EPDCCH within the USS or CSS region. When the EPDCCH scrambled with the determined RNTI is received, the EPDCCH is decoded to acquire HI-DCI including an ACK/NACK for the transmitted PUSCH. In this case, only one ACK/NACK information for one MTC device may be contained in one HI-DCI. Alternatively, ACK/NACK information for a plurality of MTC devices may be contained in one HI-DCI.

At this time, the MTC device may determine its RNTI, based on its repetition level or coverage level, from among a plurality of RNTIs. Here, the repetition level may be an index value indicating the number of repetitions or specific repetition. For example, when the repetition level is 2, the base station (BS) may transmit a total of two downlink channel bundles to the MTC device. In this case, the MTC device may determine its RNTI based on the repetition level 2. Here, generally speaking, repetition number 2 means to transmit 2 times (2 subframes) in total.

Alternatively, the MTC device may determine an RNTI value for itself among a plurality of RNTIs through the following method or a combination of the following methods. 1) As a first scheme, the MTC device may set the RNTI value to be used from the base station through the upper layer signal. 2) As a second scheme, the MTC device may determine the RNTI value to be used according to its MTC device ID (e.g., C-RNTI). For example, when the number of new RNTIs to be used for scrambling the EPDCCH to which the HI-DCI is transmitted is N_RNTI, the index of the RNTI value to be used by the specific MTC device may be determined according to the MTC device ID mod N_RNTI. 3) As a third scheme, according to the location (index) of the EPDCCH and/or PDSCH receiving subbands on the USS region of the MTC device or on the location (index) of the PUSCH transmission subband of the MTC device, the MTC device may determine the value of the new RNTI, to be used by itself, from among the plurality of RNTIs. 4) As a fourth scheme, the MTC device may determine a new RNTI among the plurality of RNITs based on the location (index) of the resource, from which the EPDCCH was received, including the scheduling information for the PUSCH for which the MTC device is to receive the ACK/NACK information. 5) As a fifth scheme, the MTC device may determine a new RNTI among a plurality of RNITs based on the location (index) of the resource on which the PUSCH for receiving the ACK/NACK information is received by the MTC device or the location (index) of the resource that transmitted the PUSCH in the uplink subband. For example, the value of the new RNTI for receiving the EPHICH (ACK/NACK information for PUSCH transmission) may be set according to the lowest PRB index of the PRB resources that the MTC device has transmitted the PUSCH or the lowest PRB index of the PRB resources that transmitted the PUSCH in the uplink sub-band. The new RNTI may be determined based on the lowest PRB index. 6) As a sixth scheme, the MTC device may determine any one among a plurality of RNITs based on its coverage level (CE level), coverage extension level (or repetition level/number) of the EPDCCH, or coverage extension level (or repetition level/number) of the PUSCH (to receive the ACK/NACK information). In other words, the RNTI value may be determined according to the CE level of the MTC device or the CE (or repetition level/number) of the EPDCCH or the CE level (or repetition level/number) of the PUSCH to receive the ACK/NACK information.

Meanwhile, the EPDCCH scrambled with the new RNTI may exist only one in the resource area (CSS or USS region) where the MTC device can receive the EPDCCH including the HI-DCI. In this case, the EPDCCH scrambled with a particular new RNTI may contain the ACK/NACK information for all MTC devices that use the new RNTI value equally. In this case, each MTC device may determine the location, where the EPDCCH scrambled with the particular new RNTI is received, according to section I-2 described below.

On the other hand, a plurality of EPDCCH scrambled with a particular new RNTI among a plurality of new RNTIs may exist in a resource area (CSS or USS region) where the MTC device can receive the EPDCCH including the HI-DCI. In this case, the ACK/NACK information for one or more MTC devices may be included in the corresponding EPDCCH. At this time, the ACK/NACK information for each MTC device may be received through one EPDCCH among a plurality of EPDCCHs scrambled with the particular new RNTI. In this case, each MTC device may determine whether ACK/NACK information is received for a PUSCH transmitted by itself through any EPDCCH among a plurality of EPDCCHs scrambled with the particular new RNTI based on section I-2 to be described later.

I-1-3. C-RNTI

In the resource area (CSS or USS region) where the MTC device can receive the EPDCCH including the HI-DCI, the base station may scramble the corresponding EPDCCH based on the C-RNTI to transmit the EPDCCH.

The EPDCCH scrambled with a particular C-RNTI for transmitting HI-DCI may exist only in a resource area (CSS or USS region) where the MTC device can receive the HI-DCI for a specific MTC device. In this case, only one ACK/NACK information for one MTC device having the corresponding C-RNTI value may be contained in one HI-DCI that is scrambled and transmitted with the C-RNTI. In this case, each MTC device may determine the location, where the EPDCCH scrambled with the C-RNTI that transmits the corresponding HI-DCI is received, based on section I-2 described below.

I-2. A Method of Determining a Position Where an EPDCC, Including ACK/NACK Information for a PUSCH Transmitted by Itself, from Among a Plurality of EPDCCHs, is Received (1) Only one EPDCCH (including HI-DCI) scrambled with a particular RNTI may exist for a resource area (CSS or USS region) where the MTC device can receive the EPDCCH.

In this case, the MTC device may determine the location of the resource where the EPDCCH including the HI-DCI is received through the following method. At this time, since the EPDCCH candidate index can indicate the location of the resource on which the EPDCCH is received, when the EPDCCH candidate index is known, the location of the resource to receive the EPDCCH may be known.

First, the EPDCCH scrambled with a particular RNTI may be received on a resource location determined by a predetermined or specific rule. For example, the EPDCCH scrambled with a particular RNTI may always be received through a particular EPDCCH candidate (e.g., EPDCCH candidate index 0 with aggregation level 8).

Alternatively, the EPDCCH scrambled with the particular RNTI may be received through any EPDCCH candidate. In this case, the MTC device may perform blind decoding to detect the EPDCCH scrambled with the particular RNTI.

When the EPDCCH including the HI-DCI is scrambled with the C-RNTI and the corresponding EPDCCH exists only in the resource area (CSS or USS region) where the specific MTC device can receive the EPDCCH, the MTC device may know the location of the transmission resource of the EPDCCH including the HI-DCI in the method as described below. In the case where the resource area where the EPDCCH including the HI-DCI can be received is the CSS region, when the MTC device finds the location of the EPDCCH scrambled with the C-RNTI, the corresponding EPDCCH may always be determined as the EPDCCH including the HI-DCI. If the EPDCCH including other DCI than the HI-DCI in the EPDCCH CSS region can also be scrambled with the C-RNTI, the MTC device may perform blind decoding to distinguish the HI-DCI from the other DCI. When the resource area capable of receiving the EPDCCH including the HI-DCI is the USS region, the MTC device may perform blind decoding to distinguish the HI-DCI from the other DCI.

(2) Meanwhile, a plurality of EPDCCHs scrambled with a particular RNTI may exist in a resource area (CSS or USS region) where the MTC device can receive the EPDCCH.

In this case, the location (e.g., the EPDCCH candidate index), where the EPDCCH for a specific MTC device is received, from among a plurality of EPDCCHs scrambled with a particular RNTI may be transmitted through a predetermined or resource location determined by a specific rule. The location (e.g., the EPDCCH candidate index) at which the EPDCCH for a specific MTC device is transmitted may be determined according to the following method or a combination of the following methods.

The resource location, where the EPDCCH for a specific MTC device is received, from among a plurality of EPDCCHs scrambled with a specific RNTI may be determined according to ID (e.g., C-RNTI) of the MTC device. For example, the base station may determine the resource location or the transmittable resource locations (so as to be distinguishable from each other) to transmit the EPDCCH to the corresponding MTC device according to the MTC device ID. The EPDCCH including the HI-DCI may be transmitted to the corresponding MTC device through one resource location among the predetermined (distinguished)) resource location or resource location candidates.

Among the EPDCCHs scrambled with a particular RNTI, the resource location where the EPDCCH for a specific MTC device is received may be determined according to an ID of the specific group to which the MTC device belongs. Specifically, the corresponding group ID may be a value set by the base station. For example, the base station may determine a resource location or transmittable resource location (so as to be distinguishable from each other) to transmit an EPDCCH for an MTC device belonging to the corresponding group according to the group ID. the EPDCCH may be transmitted to the MTC devices belonging to the corresponding group on one resource location among the predetermined (distinguished)) resource location or resource location candidates.

Among the EPDCCHs scrambled with the particular RNTI, the resource location where a specific MTC device can receive the EPDCCH scrambled with a particular RNTI is determined according to the location (index) of the EPDCCH and/or PDSCH receiving subbands in the USS region or the location (index) of the PUSCH transmission subband of the MTC device. For example, according to the location (index) of the EPDCCH and/or PDSCH receiving subbands in the USS region or the location (index) of the PUSCH transmission subband of the MTC device, the base station may determine the resource location or the transmittable resource location (so as to be distinguishable from each other) to transmit the EPDCCH to the corresponding MTC device according to the MTC device ID. The EPDCCH including the HI-DCI may be transmitted to the corresponding MTC device through one resource location among the predetermined (distinguished)) resource location or resource location candidates.

Among the EPDCCHs scrambled with the particular RNTI, the resource location where a specific MTC device can receive the EPDCCH scrambled with a particular RNTI may be determined according to the location (index) of the resource from which the EPDCCH was received, which includes the scheduling information for the PUSCH for which the MTC device is to receive the ACK/NACK information. At this time, the base station may determine the resource position or the transmittable resource position (so as to be distinguishable from each other) to transmit the EPDCCH to the MTC device. The EPDCCH including the HI-DCI may be transmitted to the corresponding MTC device through one resource location among the predetermined (distinguished)) resource location or resource location candidates.

Among the EPDCCHs scrambled with the particular RNTI, The resource location where a specific MTC device can receive the EPDCCH scrambled with a particular RNTI may determined according to the location (index) of the resource to which the MTC device has transmitted the PUSCH to receive the ACK/NACK information, or the location (index) of the resource that transmitted the PUSC in the uplink sub-band. For example, the base station (BS) may determine a resource location where the EPDCCH for the MTC device is transmitted, or transmittable resource locations (to be distinguished from each other) according to the location (index) of the resource that transmitted the EPDCCH including scheduling information for the corresponding PUSCH or according to the location (index) of the corresponding PUSCH. The EPDCCH may be transmitted to the corresponding MTC device through one resource location among the corresponding predetermined (distinguished)) resource location or resource location candidates. Alternatively, among the EPDCCHs scrambled with the RNTI, the resource location where the base station transmits the EPDCCH for a specific MTC device may be determined according to the lowest PRB index among the PRBs of the PUSCH or the lowest PRB index for the PUSCH in the uplink subband.

Among the EPDCCHs scrambled with a specific RNTI, the resource location where a specific MTC device receives an EPDCCH may be determined according to be determined according to the EPDCCH repetition level (or coverage level) of the MTC device.

Among the EPDCCHs scrambled with a specific RNTI, the resource location where a specific MTC device receives an EPDCCH may be determined according to a coverage extension level (CE level) of the MTC device, the extension level (or repetition level) of the coverage of the EPDCCH, or a coverage extension level (or repeat level) of the PUSCH. In other words, the resource location where a specific MTC device receives the EPDCCH may be determined according to the CE level of the UE, the CE level (or repetition level/number) of the EPDCCH, or according to the CE level (or repetition level/number) of the PUSCH to receive the ACK/NACK.

I-3. When ACK/NACK Information for a Plurality of PUSCHs is Transmitted to One DCI, a Method of Determining the Location where the MTC Device Receives Its Own ACK/NACK Information ACK/NACK information for multiple PUSCH transmissions may be included in HI-DCI. For example, a total of N ACK/NACK information may be transmitted in HI-DCI, which may be ACK/NACK information for a total of N PUSCH transmissions. For example, the N ACK/NACK information may be represented through a bitmap of N bits in length, and each bit may indicate an ACK/NACK for each PUSCH transmission. At this time, the MTC device should find out whether which ACK/NACK information among N ACK/NACK information is ACK/NACK information for the PUSCH transmitted by itself (the MTC device). Among the plurality of ACK/NACK information included in the HI-DCI, a method to determine a location (e.g., an index in the bitmap) where an ACK/NACK for a specific PUSCH is received may be as follows.

Among the plurality of ACK/NACK information included in the HI-DCI, the location information on which the ACK/NACK for the specific PUSCH is received may be indicated in the DCI including the scheduling information for the corresponding PUSCH. For example, a 3-bit length field in the DCI may indicate whether which bit among a total of 8 bits for HI-DCI is ACK/NACK information for the PUSCH of the MTC device.

Among the plurality of ACK/NACK information included in the HI-DCI, a location including an ACK/NACK for a PUSCH of a specific MTC device may be determined according to the lowest PRB index among the PRB indexes to which the PUSCH is transmitted in the uplink subband. For example, when the lowest PRB index used for a specific MTC device to transmit a PUSCH is 3 among the PRB indexes 0 to 5 in the uplink sub-band, ACK/NACK information for the corresponding PUSCH may be received through a third bit among bits of the HI-DCI. Alternatively, for example, when j='the lowest PRB index for PUSCH' modulo 'HI-DCI bits size (HI-DCI bitmap size)', jth bit of the HI-DCI bits may indicate ACK/NACK information for the corresponding PUSH.

Alternatively, according to the offset value included in the DCI including the value of the lowest index among the PRB indexes used for transmitting the PUSCH in the uplink sub-band and the scheduling information of the PUSCH, the location of the ACK/NACK for the corresponding PUSCH may be determined. For example, when j='the lowest PRB index for PUSCH' modulo 'HI-DCI bits size (HI-DCI bitmap size)'+'offset', the jth bit of the HI-DCI bits may indicate ACK/NACK information for the corresponding PUSH.

The location information on which the ACK/NACK for the corresponding PUSCH among the bits of the HI-DCI is transmitted may be determined according to the lowest ECCE index among the ECCE resources received by the DCI including the scheduling information for the PUSCH. For example, when j='the lowest ECCE index for M-PDCCH transmitting UL grant' modulo 'HI-DCI bits size (HI-DCI bitmap size)', the jth bit of the HI-DCI bits may indicate ACK/NACK information for the corresponding PUSH.

In addition, according to the value of the lowest ECCE index among the ECCE resources received by the DCI including the scheduling information of the PUSCH and the offset value included in the corresponding DCI, the MTC device may determine the location of ACK/NACK transmission for the PUSCH in the HI-DCI. For example, when j='the lowest ECCE index for M-PDCCH transmitting UL grant' modulo 'HI-DCI bits size (HI-DCI bitmap size)'+ 'offset', the j-th bit of the HI-DCI bits may indicate ACK/NACK information for the corresponding PUSCH.

The location where the ACK/NACK for the corresponding PUSCH among the bits of the HI-DCI is transmitted may be determined according to the index of the subband to which the PUSCH is transmitted. For example, when j='narrowband index for PUSCH transmission' modulo 'HI-DCI bits size (HI-DCI bitmap size)', the jth bit of the HI-DCI bits may indicate ACK/NACK information for the corresponding PUSH.

In addition, according to the offset value included in the DCI including the index of the uplink sub-band to which the PUSCH is transmitted and the scheduling information of the PUSCH, the MTC device may determine the location where the ACK/NACK for the corresponding PUSCH is transmitted in the HI-DCI. For example, when j='narrowband index for PUSCH transmission' modulo 'HI-DCI bits size (HI-DCI bitmap size)'+'offset', the jth bit of the HI-DCI bits may indicate ACK/NACK information for the corresponding PUSH.

According to the specific value to be set through an upper layer signal (e.g., an RRC signal), the MTC device may determine the location where an ACK/NACK for the corresponding PUSCH among the bits of the HI-DCI is received. In addition, according to the offset value included in the DCI including the specific value set through the upper layer signal (e.g., RRC signal) and the scheduling information of the PUSCH, the MTC device may determine the location where the ACK/NACK for the corresponding PUSCH is transmitted in the HI-DCI. For example, when j='a value indicating ACK/NACK location configured by RRC' modulo 'HI-DCI bits size (HI-DCI bitmap size)'+'offset', the jth bit of the HI-DCI bits may indicate ACK/NACK information for the corresponding PUSH.

According to the ID (e.g., C-RNTI) of the MTC device, the location information on which the ACK/NACK for the corresponding PUSCH among the bits of the HI-DCI is transmitted may be determined. In addition, the location at which the ACK/NACK for the corresponding PUSCH is transmitted in the HI-DCI may be determined according to the offset value contained in the DCI including the ID of the MTC device (e.g., C-RNTI) and the scheduling information of the PUSCH. For example, when j='UE ID' modulo 'HI-DCI bits size (HI-DCI bitmap size)'+'offset', the jth bit of the HI-DCI bits may indicate ACK/NACK information for the corresponding PUSH.

II. Reception of the EPHICH, Including ACK/NACK, which is Received on a Specific Resource Location EPHICH (ACK/NACK information for PUSCH transmission) for the MTC device may be received through a specific resource area.

II-1. Location of PRB Region where EPHICH is Received

The position of the physical resource block (PRB) region in which the EPHICH is received may be set as follows.

(1) Reception Through Resources in the CSS/USS Region

The EPHICH for the MTC device may be received in the PRB resource for EPDCCH CSS. For example, when the EPDCCH CSS can be received in a first PRB of the center six PRBs, the EPHICH for the MTC device may also be received on the resource in the first PRB among the six PRBs.

Alternatively, the EPHICH for the MTC device may be received in the PRB resource for the EPDCCH USS of the corresponding MTC device. For example, when EPDCCH USS can be received within the first PRB in the downlink subband in which the MTC device operates, the EPHICH for the MTC device may also be received on the resource within the first PRB in the downlink subband.

(2) Reception on Cell-Common PRB Resource/MTC Device-Specific PRB Resource

The EPHICH for the MTC device may be received on the cell-common PRB resource, regardless of the location of the CSS region or USS region of the MTC device. Specifically, the corresponding PRB location may be located in the center six PRBs. Alternatively, the subband where the PRB is located in which the EPHICH is received may be the same as the subband where the EPDCCH CSS is located.

Alternatively, the EPHICH for the MTC device may be received on an MTC device-specific PRB resource, regardless of the location of the CSS region or USS region of the MTC device. Specifically, the corresponding PRB location may be located in the downlink subband for receiving the EPDCCH USS and/or an MTC device specific PDSCH. For example, the EPHICH may be received on the first PRB resource in the MTC device specific downlink subband.

In this case, a situation may occur in which a PRB resource for receiving EPHICH and a PRB resource for receiving EPDCCH on CSS/USS overlap in a specific subframe. Alternatively, a situation may occur in which a PRB resource in which a corresponding MTC device receives a PDSCH and a PRB resource that receives an EPHICH overlap in a specific subframe. For the sake of understanding, referring to the drawings, it is as follows.

Figure 14A:
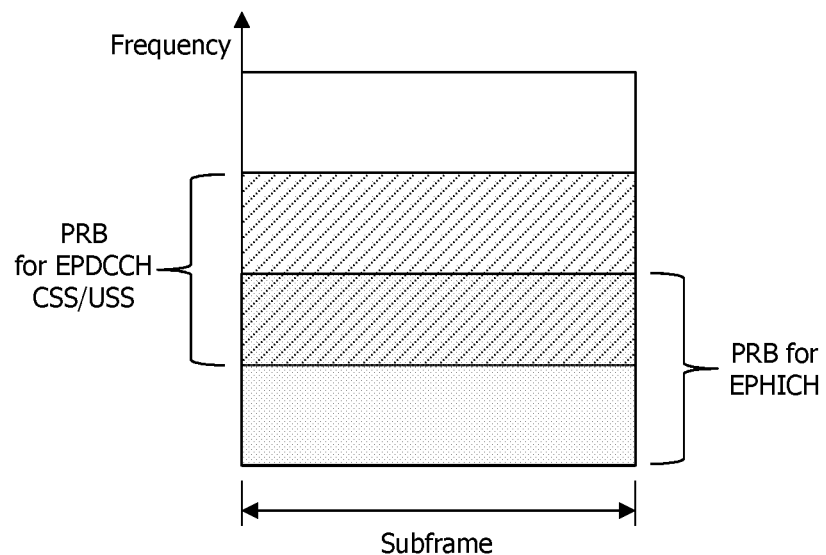
FIG. 14A shows an example in which the PRB resource for reception of the EPHICH overlaps with the PRB resource for the EPDCCH CSS (USS)
Figure 14B:
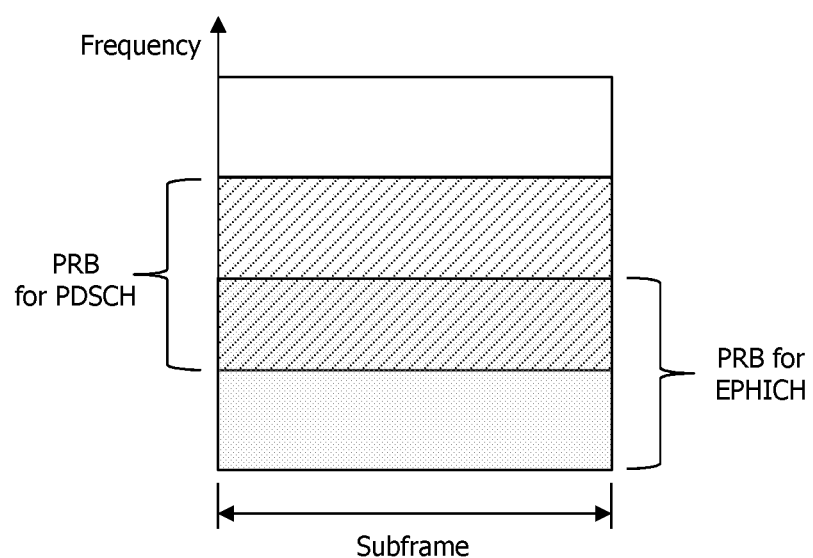
FIG. 14B shows an example in which the PRB resource for reception of the EPHICH overlaps with the PRB resource for reception of the PDSCH.

FIG. 14A shows an example in which the PRB resource for reception of the EPHICH overlaps with the PRB resource for the EPDCCH CSS (or USS), and FIG. 14B shows an example in which the PRB resource for reception of the EPHICH overlaps with the PRB resource for reception of the PDSCH.

As shown in FIGS. 14A and 14B, when the PRB resource for reception of the EPHICH overlaps with the PRB resource for reception of the EPDCCH on the CSS/USS, or overlaps with the PRB resource for reception of the PDSCH, in this section, it is suggested that the MDC device operate as follows.

When the PRB for the reception of the EPHICH and the PRB for the reception of the EPDCCH on the CSS or the reception of the PDSCH are overlapped, the MTC device may determine that reception of the EPHICH is prioritized in the corresponding overlapping PRB region. Accordingly, the MTC device may assume 1) that the EPDCCH or PDSCH is punctured on the overlapping PRB, and only the EPHICH is received. Alternatively, the MTC device may determine that 2) when a part RE of the PRB for reception of EPHICH overlaps a part RE of the PRB for reception of EPDCCH on CSS/USS, the EPDCCH or PDSCH is punctured in the RE, and only EPHICH can be received.

II-2. Determination of EPHICH Group Number and Orthogonal Sequence Index

As described above with reference to FIG. 8, the existing PHICH resource may be determined by the PHICH group number (i.e., $n^{group}_{PHICH}$) and the orthogonal sequence index ($n^{seq}_{PHICH}$). The EPHICH resource may be determined by the group number and the orthogonal sequence index on the same principle as in the PHICH.

At this time, the EPHICH group number may be determined through the following scheme or a combination of the following schemes. 1) In a first scheme, the MTC device may set the EPHICH group number to be used by the base station through an upper layer signal. 2) In a second scheme, the MTC device may determine the EPHICH group number to use according to its MTC device ID (e.g., C-RNTI). 3) In a third scheme, the MTC device may determine the EPHICH group number based on the location (i.e., index) of the subband on which the USS and/or PDSCH is received, or based on the position (index) of the subband to which the MTC device transmits the PUSCH. 4) In a fourth scheme, the MTC device may determine the value of the EPHICH group number based on the location (index) of the resource from which the EPDCCH including the scheduling information of the PUSCH was received. 5) In a fifth scheme, the MTC device may determine the index of the EPHICH group number based on the location (index) of the resource to which the PUSCH was transmitted or the location (index) of the resource that transmitted the PUSCH in the uplink (UL) subband. Specifically, the index of the EPHICH group number may be determined according to the lowest PRB index among the PRB resources that transmitted the PUSCH or the lowest PRB index among the PRB resources that transmitted the PUSCH in the uplink subband. 6) In a sixth scheme, the EPHICH group number may be determined according to the EPHICH repetition level of the MTC device.

The EPHICH orthogonal sequence index may also be determined according to the above scheme or a combination of the above schemes.

III. Transmission through an Uplink Grant

The base station may inform the MTC device of ACK/NACK information about the PUSCH transmission by transmitting (E) PDCCH including the uplink grant instead of the PHICH/EPHICH of the MTC device.

Specifically, when the MTC device does not directly receive the ACK/NACK information for the PUSCH transmitted by itself (the MTC device) and instead receives the EPDCCH including the uplink grant from the base station, it is possible to determine whether the transmitted PUSCH is successful or failed based on a new data indicator (NDI) field in the EPDCCH.

At this time, when the base station successfully receives the PUSCH transmitted by the MTC device and the MTC device does not have any data to be transmitted to the base station, the base station may not transmit the uplink grant to the MTC device. In this case, even if the MTC device transmits the PUSCH on the subframe #n but does not receive the uplink grant on the subframe #n+4, the MTC device may determine that the transmitted PUSCH is successful.

However, even though the base station has transmitted the uplink grant to the MTC device but the MTC device has not received the (E) PDCCH including the uplink grant, the MTC device may cause a problem of erroneously determining that the transmission of the PUSCH was successful.

In addition, when the MTC device uses the asynchronous HARQ scheme for PUSCH transmission, according to the above-described method, there is a problem that the MTC device does not determine whether the PUSCH transmission is successful until it receives an uplink grant (for the same HARQ process number) from the base station. In addition, even if the PUSCH transmitted by the MTC device has been successfully received by the base station and the MTC device has no more data to be transmitted to the base station, it may be necessary for the MTC device to store the data inefficiently for a very long time without knowing whether the transmission of the PUSCH is successful or not.

To solve this problem, in this section, if the private MTC device does not receive the uplink grant (for the same HARQ processor number) until subframe # n+K after transmitting PUSCH in subframe #n, it may be assumed that the transmission of the PUSCH is successful. At this time, K may be the same as 4. Alternatively, the value of K may be a predetermined value or a value set through an upper layer signal.

Meanwhile, in order to solve the above-mentioned problem, that is, the PUSCH transmission is successful but the base station can not determine whether the PUSCH transmission is successful because the uplink grant is not transmitted, the following methods are suggested. According to the proposed method, if the base station successfully receives the PUSCH transmitted by the MTC device, the base station may transmit the uplink grant even if there is no more data to be transmitted by the MTC device.

For example, when the base station successfully receives a PUSCH from the MTC device and the MTC device no longer has data to transmit, the base station may set the resource block assignment field such that the size of the resource block indicated by the resource block assignment field in the UL grant is zero. That is, the base station indicates that the NDI field in the UL grant is new data, and the size of the resource block indicated by the resource block assignment field is set to be zero. The uplink grant set as described above may indicate (i.e., ACK) that the base station (BS) has successfully received the PUSCH transmitted by the MTC device. That is, when the MTC device receives the uplink grant, it may be interpreted that the uplink grant indicates an ACK for the PUSCH transmitted by the MTC device. In this case, in order to make it clear that the uplink grant indicates an ACK for the PUSCH, the base station may transmit an uplink grant to the subframe # n+4 for the PUSCH received in the subframe #n from the MTC device.

As another example, when the transmission of the PUSCH of the MTC device is successful and the MTC device has no more data to transmit, the base station may transmit the uplink grant in which all bits of the resource block assignment field are set to 1. According to the existing technique, the resource block assignment field in which all bits are set to 1 may be not used. Accordingly, the BS may set the NDI field in the uplink grant to indicate that it is new data, and by setting all the bits of the resource block assignment field to 1, it may be possible for the BS to inform the MTC device that the uplink grant is the ACK for the PUSCH transmitted by the MTC device. That is, when the MTC device receives this uplink grant (scrambled with the C-RNTI), it may be interpreted that the uplink grant is an ACK for the PUSCH transmitted by the MTC device. In order to make this clear, if the base station receives the PUSCH from the MTC device in the subframe #n, the uplink grant indicating the ACK for the PUSCH may be transmitted to the subframe # n+4.

IV. Use of Reduced Downlink/Uplink Grant

To extend the coverage of the MTC device, it may be considered to reduce the code rate by reducing the size of the DCI. To this end, in order to achieve this, extremely, all the settings required for transmission of the PDSCH/PUSCH may be fixedly set or set in advance, and it may be considered that the uplink/downlink grant transmitted by the base station only includes information on whether to transmit PDSCH/PUSCH or information on some setting. In addition, since it is expected that the MTC device using only the reduced sub-band instead of the entire system band will send and receive a small amount of data traffic so as to reduce the cost, all the settings required for transmission of the PDSCH/PUSCH may be fixedly set or set in advance, and the uplink/downlink grant transmitted by the base station may include whether or not the PDSCH/PUSCH is transmitted or only a few settings.

As such, when the downlink/uplink grant for one MTC device includes only little information, the base station may transmit the downlink/uplink grant for a plurality of MTC devices (MTC devices in a specific group) at a time. For example, similar to DCI format 3/3A for TPC commands, the base station may transmit a (new) DCI format that includes a downlink/uplink grant for a group of MTC devices.

The DCI including the uplink/downlink grant transmitted from the base station to the MTC device may include one or more of the following.

PDSCH (PUSCH) transmission status: Indication to send PDSCH (PUSCH) to MTC device TBS Indication: Information about the transmission block size used for transmission of the PDSCH (PUSCH)

NDI: Information about whether the scheduled PDSCH (PUSCH) is new data or retransmitted data ACK/NACK: A/N information about the PUSCH transmitted by the MTC device As described above, when all of the settings required for transmission of the PDSCH/PUSCH are fixedly set or set in advance, and when whether PDSCH/PUSCH is transmitted or only a few settings are included in the downlink/uplink grant, the MTC device may determine whether the PUSCH transmitted by itself through reception of (E) PDCCH including (E) PHICH or HI-DCI is success or failure, and if the MTC device fails, the MTC device may retransmit the PUSCH without receiving another uplink grant.

The MTC device may retransmit the PUSCH using preset or predefined settings. In addition, the MTC device may directly use the settings included in the uplink grant received for the initial transmission of the corresponding PUSCH. Alternatively, an uplink grant (and/or uplink grant for new data transmission) including scheduling information for retransmission of the PUSCH, may be received through (E) PHICH or (E) PDCCH with ACK/NACK information for the previously transmitted PUSCH. That is, the base station may transmit (E) the PHICH or the EPDCCH including the setting (including the scheduling information) for retransmission of the PUSCH together with the NACK information to the MTC device.

As described above, the embodiments of the present invention may be implemented by various means. For example, embodiments of the present invention may be implemented by hardware, firmware, software, or combinations thereof. Specifically, it will be described with reference to the drawings.

Figure 15:
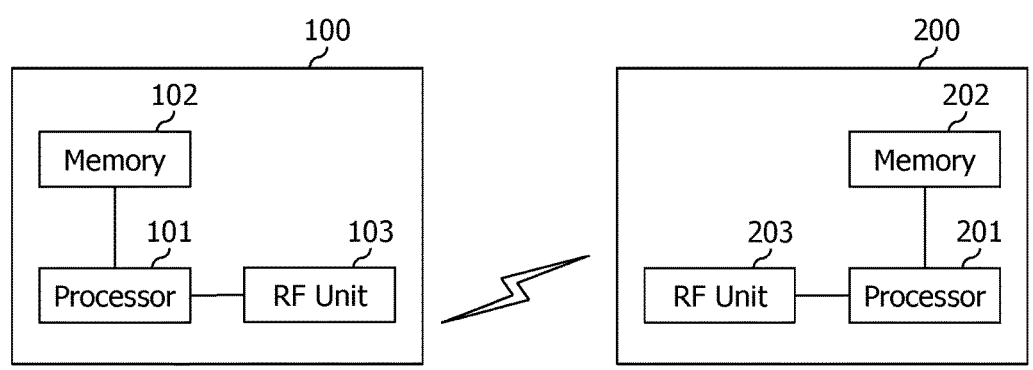
FIG. 15 is a block diagram illustrating a wireless (or radio) communication system in which the present disclosure is implemented.

FIG. 15 is a block diagram illustrating a wireless communication system in which the present disclosure is implemented.

The base station 200 may include a processor 201, a memory 202 and an radio frequency (RF) unit 203. The memory 202 may connected to the processor 201 and stores various information for driving the processor 201. The RF unit 203 may be connected to the processor 201 to transmit and/or receive a radio signal. The processor 201 may implement the proposed functions, procedures and/or methods. In the above-described embodiment, the operation of the base station may be implemented by the processor 201.

The MTC device 100 may include a processor 101, a memory 102, and an RF unit 103. The memory 102 may connected to the processor 101 and stores various information for driving the processor 101. The RF unit 103 may be connected to the processor 101 to transmit and/or receive a radio signal. The processor 101 may implement the proposed functions, procedures and/or methods.

The processor may include application-specific integrated circuits (ASICs), other chipsets, logic circuits, and/or data processors. The memory may include read-only memory (ROM), random access memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the exemplary system described above, although the methods are described on the basis of a flowchart as a series of steps or blocks, the present invention is not limited to the order of the steps, and some steps may occur in a different order or in a different order than the steps described above. In addition, it will also be understood by those skilled in the art that the steps shown in the flowchart are not exclusive and that other steps may be included or that one or more steps in the flowchart may be deleted without affecting the scope of the invention.

What is claimed is:

1. A method for receiving a hybrid automatic repeat request (HARQ) acknowledgment (ACK)/non-acknowledgment (NACK) signal, the method performed by a machine type communication (MTC) device and comprising:
    transmitting, by the MTC device, a physical uplink control channel (PUSCH) including uplink data;
    determining, by the MTC device, a radio network temporary identifier (RNTI) for the MTC device itself among a plurality of new RNTIs;
    monitoring reception of a downlink control channel in a search space; and
    receiving an HARQ ACK/NACK signal for transmission of the uplink data by decoding a downlink control channel scrambled with the determined RNTI.

2. The method of claim 1, wherein the downlink control channel is repeatedly received on a plurality of subframes based on a predetermined repetition level.

3. The method of claim 1, wherein an area where the MTC device monitors the downlink control channel in the search space is determined according to the repetition level.

4. The method of claim 1, wherein the MTC device determines its RNTI among the plurality of new RNTIs based on an upper layer signal received from the base station.

5. The method of claim 1, wherein the MTC device determines its RNTI among the plurality of new RNTIs based on its user equipment (UE) ID or C-RNTI.

6. The method of claim 1, wherein the MTC device determines its RNTI among the plurality of new RNTIs based on a location where the downlink control channel is received in the search space.

7. The method of claim 1, wherein the MTC device determines its RNTI among the plurality of new RNTIs based on a location of a resource that has received a downlink control channel including scheduling information for the PUSCH.

8. The method of claim 1, wherein the MTC device determines its RNTI among the plurality of new RNTIs based on a location of a resource to which the PUSCH was transmitted.

9. The method of claim 1, wherein the MTC device determines its RNTI among the plurality of new RNTIs based on its own coverage extension level, a repetition level of the downlink control channel, or a repetition level of the PUSCH.

10. A machine type communication (MTC) device for receiving a hybrid automatic repeat request (HARQ) acknowledgment (ACK)/non-acknowledgment (NACK), the MTC device comprising:
   a radio frequency (RF) unit for transmitting a physical uplink control channel (PUSCH) including uplink data; and
   a processor,
   wherein the processor performs:
      determining a radio network temporary identifier (RNTI) for the MTC device itself among a plurality of new RNTIs;
      monitoring reception of a downlink control channel in a search space through the RF unit; and
      receiving a HARQ ACK/NACK signal for transmission of the uplink data by decoding a downlink control channel scrambled with the determined RNTI.

11. The MTC device of claim 10, wherein the downlink control channel is repeatedly received on a plurality of subframes based on a predetermined repetition level.

12. The MTC device of claim 10, wherein an area in which the MTC device monitors the downlink control channel in the search space is determined according to the repetition level.

* * * * *